(12) United States Patent
Tada et al.

(10) Patent No.: US 10,236,818 B2
(45) Date of Patent: Mar. 19, 2019

(54) DRIVE AND CONTROL APPARATUS FOR MULTIPLE-WINDING MOTOR

(71) Applicant: TOSHIBA MITSUBISHI-ELECTRIC INDUSTRIAL SYSTEMS CORPORATION, Chuo-Ku (JP)

(72) Inventors: Keiko Tada, Chiyoda-ku (JP); Yuriko Okamoto, Chiyoda-ku (JP); Akira Satake, Chiyoda-ku (JP); Hiromitsu Suzuki, Chuo-Ku (JP); Masahiko Tsukakoshi, Chuo-Ku (JP); Ritaka Nakamura, Chuo-Ku (JP); Masashi Nakamura, Chuo-Ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 184 days.

(21) Appl. No.: 15/507,885

(22) PCT Filed: Oct. 15, 2014

(86) PCT No.: PCT/JP2014/077443
§ 371 (c)(1),
(2) Date: Mar. 1, 2017

(87) PCT Pub. No.: WO2016/059684
PCT Pub. Date: Apr. 21, 2016

(65) Prior Publication Data
US 2017/0294864 A1 Oct. 12, 2017

(51) Int. Cl.
*H02P 27/08* (2006.01)
*H02P 29/50* (2016.01)
(Continued)

(52) U.S. Cl.
CPC .......... *H02P 27/085* (2013.01); *H02M 7/493* (2013.01); *H02P 21/26* (2016.02); *H02P 25/22* (2013.01); *H02P 27/08* (2013.01); *H02P 29/50* (2016.02)

(58) Field of Classification Search
CPC .. H02P 25/22; H02P 5/26; H02P 21/26; H02P 29/50; H02P 27/08; H02M 7/493
See application file for complete search history.

(56) References Cited

U.S. PATENT DOCUMENTS

| 6,107,774 A | 8/2000 | Yamada et al. |
| 9,450,479 B2 * | 9/2016 | Basic ...................... H02M 1/12 |
| 2003/0085683 A1 | 5/2003 | Satake et al. |

FOREIGN PATENT DOCUMENTS

| JP | 6-38534 A | 2/1994 |
| JP | 7-135797 A | 5/1995 |

(Continued)

OTHER PUBLICATIONS

H. S. Patel, et al., "Generalized Techniques of Harmonic Elimination and Voltage Control in Thyristor Inverters: Part I—Harmonic Elimination," IEEE Transactions on Industry Applications, vol. IA-9, No. 3, May/Jun. 1973, pp. 310-317.

(Continued)

*Primary Examiner* — Eduardo Colon Santana
*Assistant Examiner* — Said Bouziane
(74) *Attorney, Agent, or Firm* — Oblon, McClelland, Maier & Neustadt, L.L.P.

(57) ABSTRACT

A drive control apparatus for multiple-winding motor includes: a modulation rate phase command generation unit which calculates currents of first and second inverters for driving a multiple-winding three-phase motor and generates a modulation rate command and a phase command for equalizing the currents; a pulse number determination unit which determines the number of pulses per half cycle on the (Continued)

basis of a frequency command; a pattern table for storing switching patterns; and gate signal generators which control the first and second inverters, using an optimal switching pattern based on the number of pulses, wherein the modulation rate phase command generation unit performs control for equalizing currents of the first and second inverters, and the phase or frequency at which the control is performed is changed in accordance with any of the number of pulses, the modulation rate, the frequency command, and the switching pattern.

20 Claims, 18 Drawing Sheets

(51) Int. Cl.
*H02P 21/26* (2016.01)
*H02P 25/22* (2006.01)
*H02M 7/493* (2007.01)

(56) References Cited

FOREIGN PATENT DOCUMENTS

| JP | 2733724 B2 | 1/1998 |
| JP | 11-262293 A | 9/1999 |
| JP | 2003-153585 A | 5/2003 |
| JP | 2007-209181 A | 8/2007 |
| JP | 2008-199874 A | 8/2008 |
| JP | 2014-138494 A | 7/2014 |
| WO | 2014/097918 A1 | 6/2014 |

OTHER PUBLICATIONS

International Search Report dated Jan. 20, 2015 in PCT/JP2014/077443 filed Oct. 15, 2014.

* cited by examiner

DRIVE AND CONTROL APPARATUS FOR MULTIPLE-WINDING MOTOR

TECHNICAL FIELD

The present invention relates to a drive control apparatus for multiple-winding motor which drives a multiple-winding motor having a plurality of windings independent of each other in one motor, by a plurality of inverters, and performs variable-speed control for the rotation.

BACKGROUND ART

In the case of controlling a multiple-winding motor with their respective winding groups connected in parallel to a plurality of inverters, there is an advantage that it is not necessary to provide a reactor for each inverter in order to prevent cross current, as compared to the case of operating a single-winding motor connected in parallel to a plurality of inverters. In addition, in the case of large capacity, it is possible to combine inverters having unit capacities, in accordance with the load capacity, so that there is an advantage that development and manufacturing of inverters become more effective and thus the cost can be reduced.

However, this method causes a problem that, for example, if there is imbalance among currents flowing through the respective winding groups, a large-capacity inverter is needed as compared to the balanced case, or if there is imbalance among the current phases, torque ripple occurs among the windings by interference due to magnetic coupling among the windings.

In order to solve such a problem, the following method is disclosed: the average and the deviation of winding currents are detected, the average value is controlled to be a command value and the deviation is controlled to be zero, thereby equalizing currents flowing through inverters and windings (for example, Patent Document 1).

In the case of using switching devices slow in switching speed, the frequency of the PWM carrier cannot be increased, and therefore a low-order harmonic is left in output voltage. For this problem, low-order harmonic eliminating PWM is disclosed which performs switching at a timing of reducing a specific low-order harmonic, by effectively utilizing a small number of times of switching (for example, Non-Patent Document 1).

CITATION LIST

Patent Document

Patent Document 1: Japanese Patent No. 2733724 (paragraphs [0006], [0007], FIG. 1, FIG. 3)

Non-Patent Literature

Non-Patent Document 1: "Generalized Techniques of Harmonic Elimination and Voltage Control in Thyristor Inverters: Part I-Harmonic Elimination" (IEEE TRANSACTIONS ON INDUSTRY APPLICATIONS, VOL. IA-9, NO. 3, MAY/JUNE 1973) (pp. 315-316)

SUMMARY OF THE INVENTION

Problems to be Solved by the Invention

However, the method disclosed in Patent Document 1 is based on triangular wave comparison PWM voltage, and in order to eliminate the current amplitude difference and the phase difference among inverters, it is necessary to perform instantaneous voltage correction by an instantaneous current difference, and thus very fast response is needed. Therefore, it is difficult to achieve this using a high-voltage large-capacity inverter which does not allow increase in the carrier speed.

In the method disclosed in Non-Patent Document 1, if control is performed with response faster than a fundamental wave, the PWM waveform which is symmetric between positive and negative and is horizontally symmetric in a ¼ cycle is deformed, and thus there is a problem that, when control is performed with high response, the control is more likely to become unstable than in the case of triangular wave PWM having a high carrier frequency.

The present invention has been made to solve the above problems, and an object of the present invention is to provide a drive control apparatus for multiple-winding motor, capable of, for a plurality of large-capacity inverters, reducing harmonics and performing highly accurate correction of imbalance among the voltage phases and amplitudes of the inverters.

Solution to the Problems

A drive control apparatus for multiple-winding motor according to the present invention includes: a plurality of power converters each of which has a switching device for driving a multiple-winding AC motor and converts a DC power supply to a variable-voltage and variable-frequency AC power supply; and a control unit for controlling the power converters. The control unit includes: an output voltage control unit for calculating and outputting output voltage and an output voltage phase for driving the multiple-winding AC motor at a desired rotation speed; and a PWM control unit for performing PWM control for the switching device. The output voltage control unit includes: an output voltage determination unit for determining the output voltage on the basis of a frequency command; an output voltage phase calculating unit for calculating the output voltage phase through integration on the basis of the frequency command; and a modulation rate phase command generation unit which calculates d-axis current and q-axis current of each power converter on the basis of the output voltage phase, calculates a modulation rate correction amount and a phase correction amount for each power converter in order to equalize currents flowing through windings of the multiple-winding AC motor, on the basis of the d-axis current and the q-axis current, and generates a modulation rate command and a phase command for controlling each power converter, on the basis of the modulation rate correction amount and the phase correction amount. The PWM control unit includes: a modulation rate calculation unit for calculating a modulation rate on the basis of the output voltage calculated by the output voltage control unit and DC voltage of the DC power supply; a pulse number determination unit for determining a number of pulses per half cycle of the PWM control for the switching device, on the basis of the frequency command; a pattern table for storing, for each number of pulses and for each magnitude of the modulation rate, a switching pattern for reducing a low-order harmonic in the output voltage; and a gate signal generator for generating a gate signal for driving the switching device, using the switching pattern from the pattern table, on the basis of the modulation rate from the modulation rate calculation unit, the number of pulses from the pulse number determination unit, and the output voltage phase calculated by the output voltage control unit. The modulation rate phase command generation unit performs control for equalizing currents of the power converters, and a phase or frequency at which the control is performed is changed in accordance with any of the number of pulses, the modulation rate, the frequency command, and the switching pattern.

Effect of the Invention

The drive control apparatus for multiple-winding motor according to the present invention includes: a modulation rate phase command generation unit which generates a modulation rate command and a phase command for equalizing currents flowing through windings of a motor; a pulse number determination unit for determining a number of pulses per half cycle of PWM control; a pattern table for storing, for each number of pulses and for each magnitude of the modulation rate, a switching pattern for reducing a low-order harmonic in output voltage; and a gate signal generator for generating a gate signal for driving each switching device, using the switching pattern, wherein the modulation rate phase command generation unit performs control for equalizing currents of power converters, and a phase or frequency at which the control is performed is changed in accordance with the number of pulses. Therefore, even in the case of using inverters having switching devices slow in switching speed, it is possible to perform PWM control with harmonics reduced while maximally utilizing a small number of times of switching, and perform highly accurate correction of imbalance among the voltage phases and amplitudes of a plurality of inverters.

DESCRIPTION OF EMBODIMENTS

Embodiment 1

Embodiment 1 relates to the following drive control apparatus for multiple-winding motor. That is, a control unit includes an output voltage control unit and a PWM control unit. The output voltage control unit includes: an output voltage determination unit; an output voltage phase calculating unit; and a modulation rate phase command generation unit which calculates a modulation rate correction amount and a phase correction amount for equalizing currents flowing through respective windings of a multiple-winding AC motor, on the basis of currents of inverters, and generates a modulation rate command and a phase command for controlling each inverter, on the basis of the calculated correction amounts. The PWM control unit includes; a modulation rate calculation unit; a pulse number determination unit for determining the number of pulses per half cycle of PWM control on the basis of a frequency command; a pattern table for storing switching patterns for reducing low-order harmonics in output voltage; and a gate signal generator for generating a gate signal for driving each switching device, using the switching pattern from the pattern table, on the basis of a modulation rate, the number of pulses, and an output voltage phase. Further, the modulation rate phase command generation unit performs control for equalizing currents of power converters, and the phase or frequency at which the control is performed is changed in accordance with the number of pulses.

Figure 1:
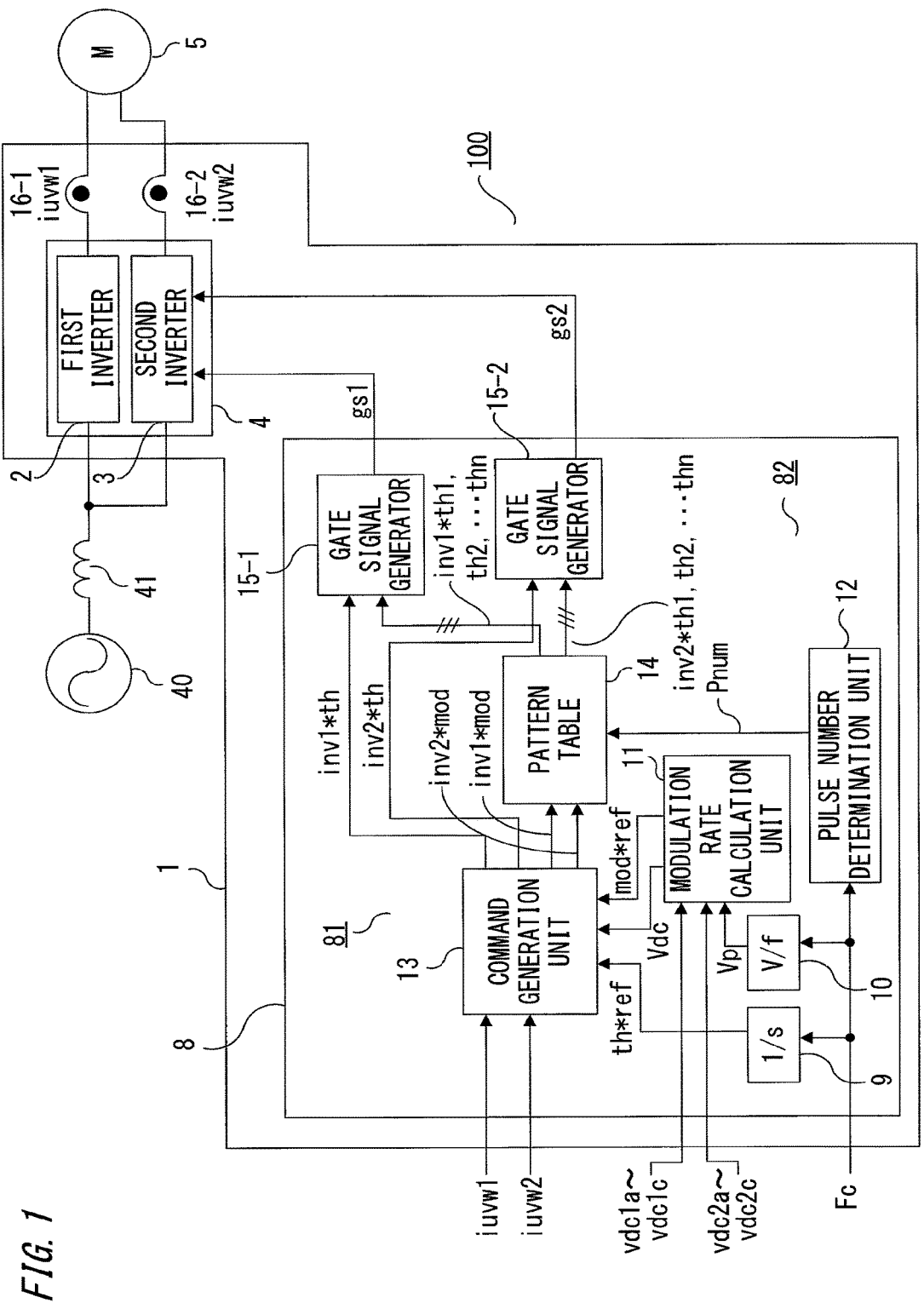
FIG. 1 is a diagram showing the entire configuration of a drive control apparatus for multiple-winding motor according to embodiment 1 of the present invention.
Figure 2:
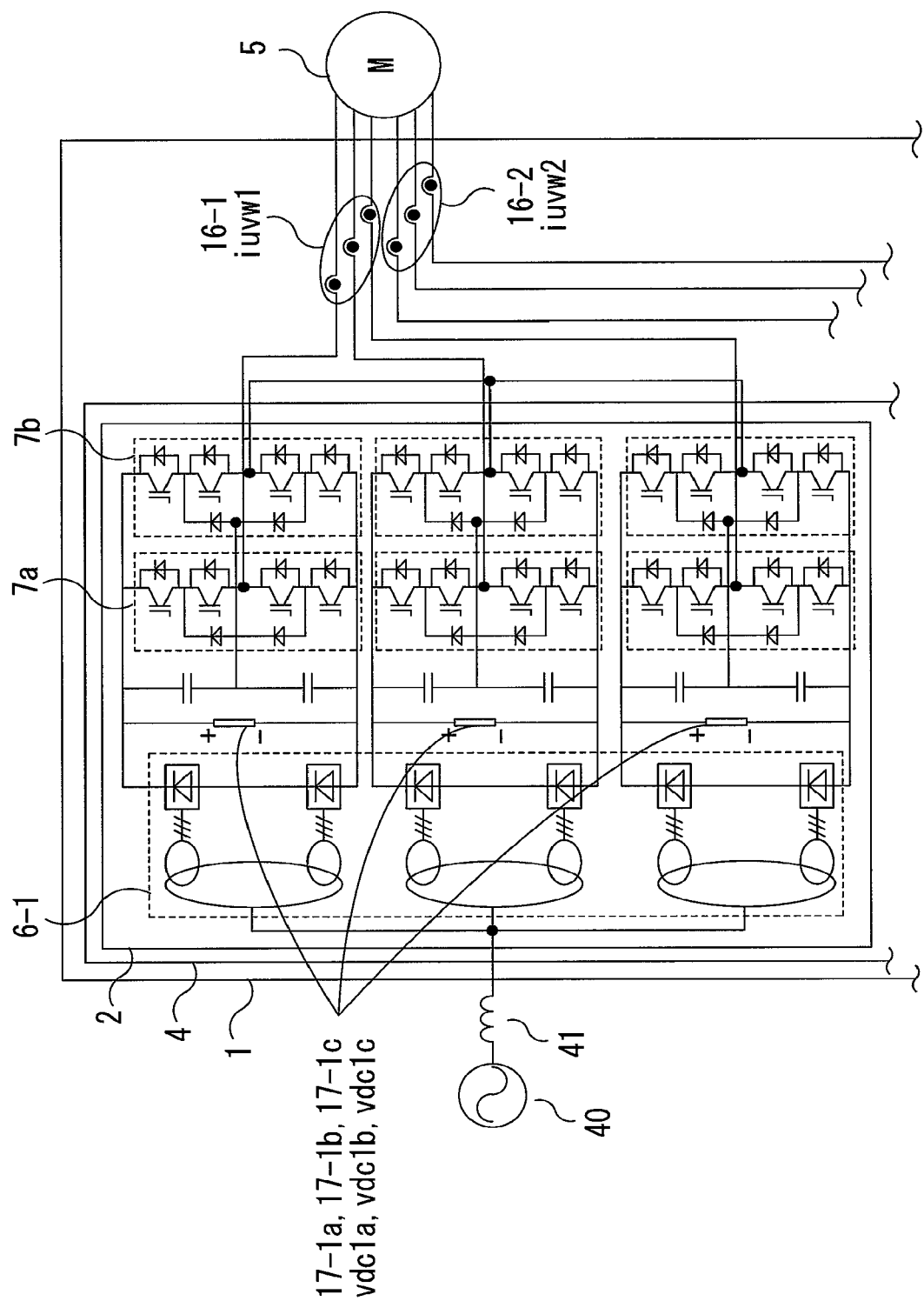
FIG. 2 is a detailed diagram showing a part of the configuration of the drive control apparatus for multiple-winding motor according to embodiment 1 of the present invention.
Figure 3:
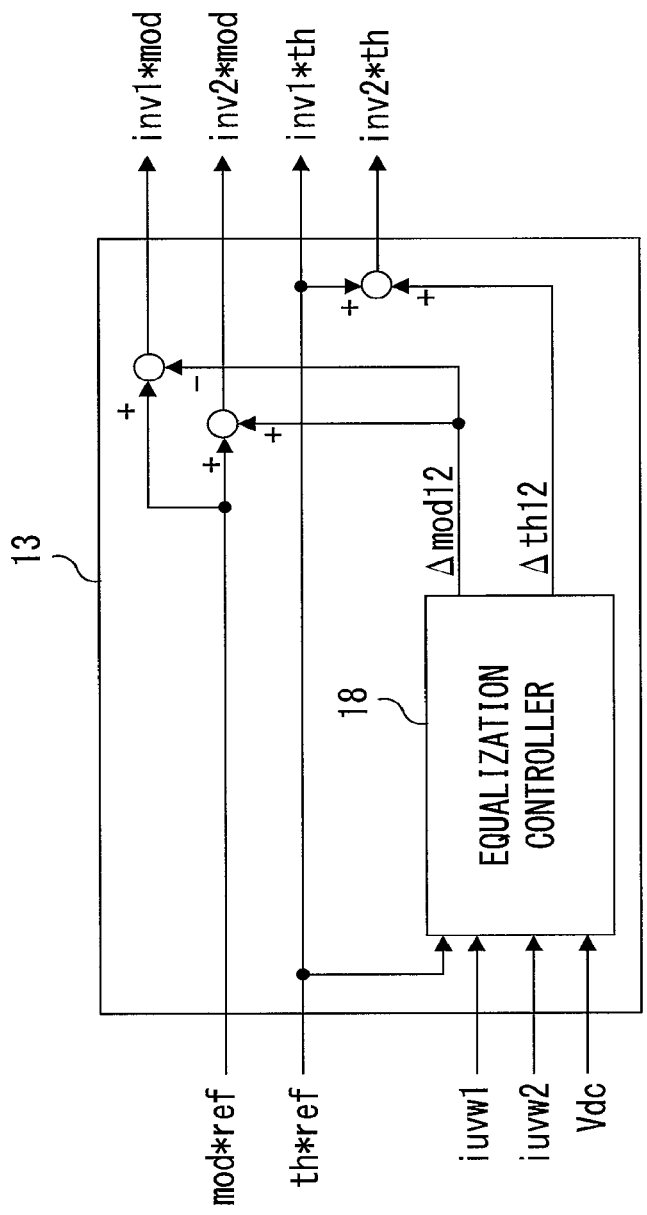
FIG. 3 is a configuration diagram of a modulation rate phase command generation unit of the drive control apparatus for multiple-winding motor according to embodiment 1 of the present invention.
Figure 4:
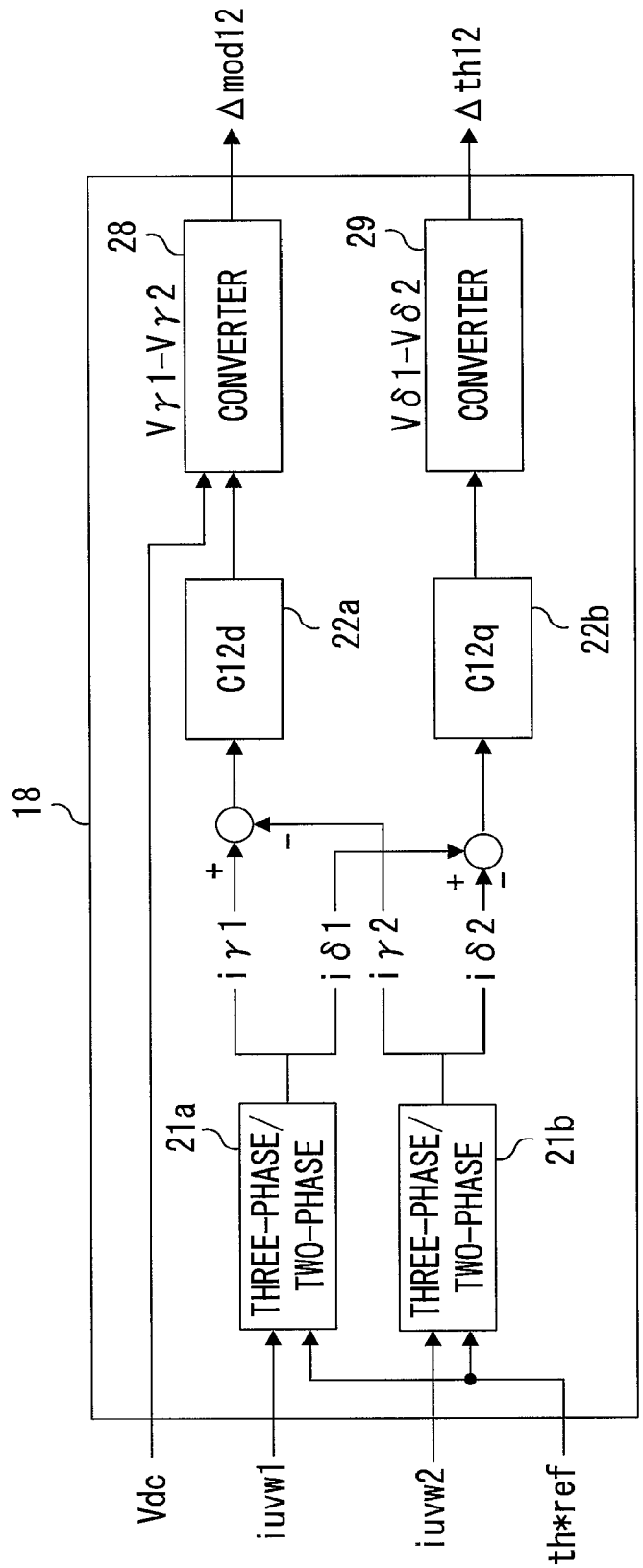
FIG. 4 is a configuration diagram of a current equalization controller of the drive control apparatus for multiple-winding motor according to embodiment 1 of the present invention.
Figure 5:
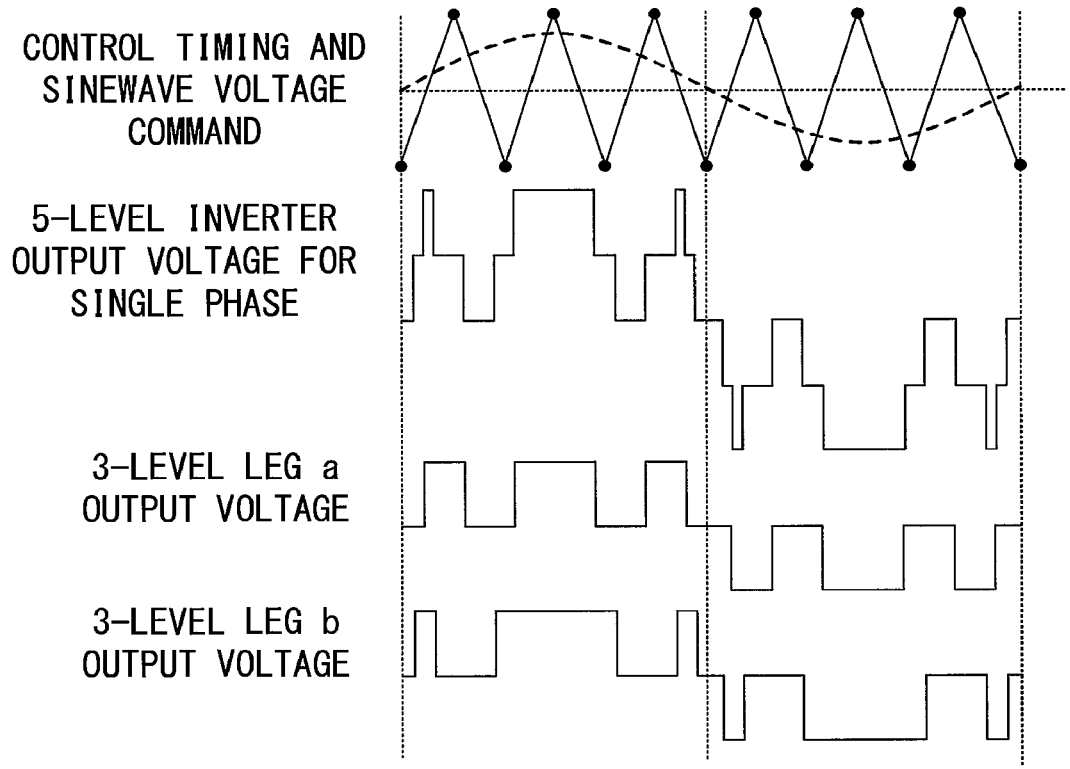
FIG. 5 is a diagram illustrating the relationship between a pulse pattern for each inverter and a control carrier in the drive control apparatus for multiple-winding motor according to embodiment 1 of the present invention.
Figure 6:
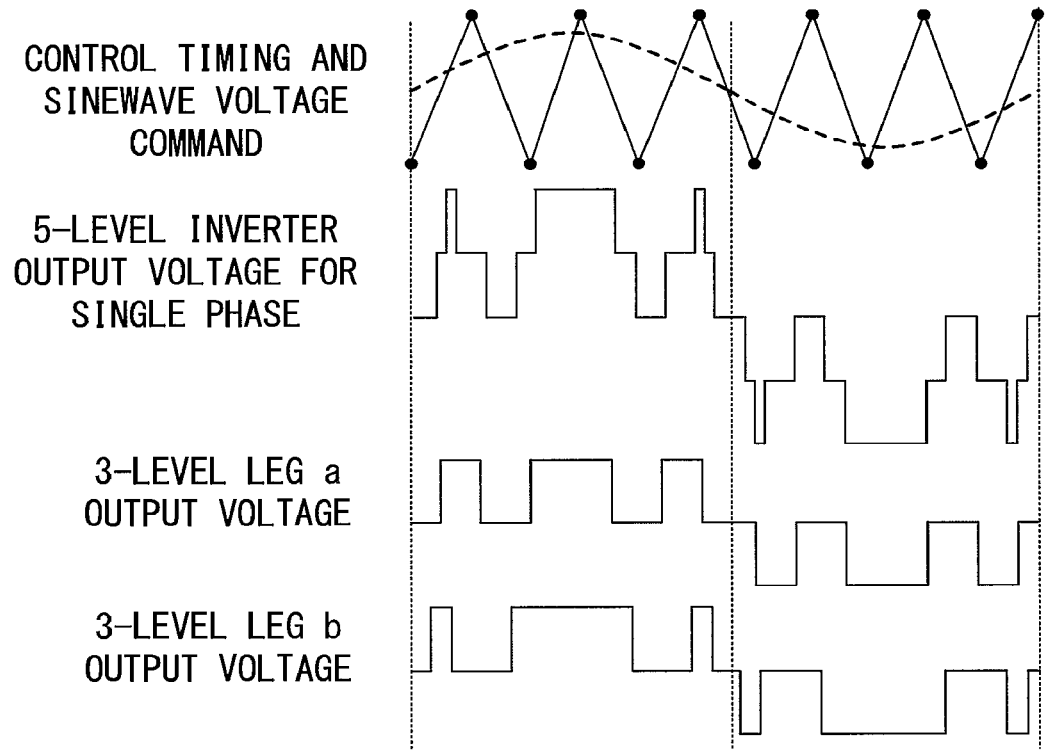
FIG. 6 is a diagram illustrating the relationship between a pulse pattern for each inverter and a control carrier in the drive control apparatus for multiple-winding motor according to embodiment 1 of the present invention.
Figure 7:
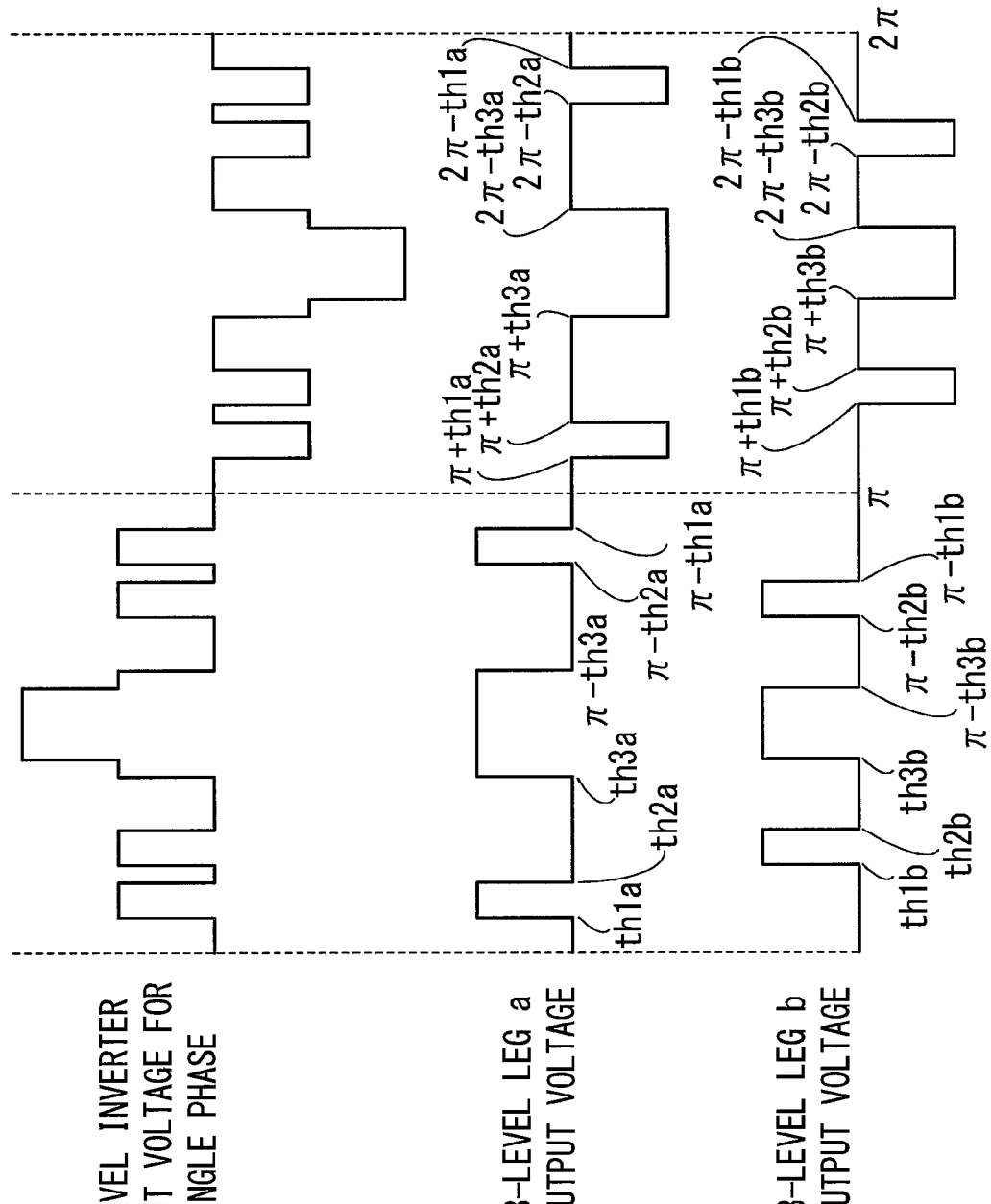
FIG. 7 is an example of output voltage of each inverter by low-order harmonic eliminating PWM in the drive control apparatus for multiple-winding motor according to embodiment 1 of the present invention.
Figure 8:
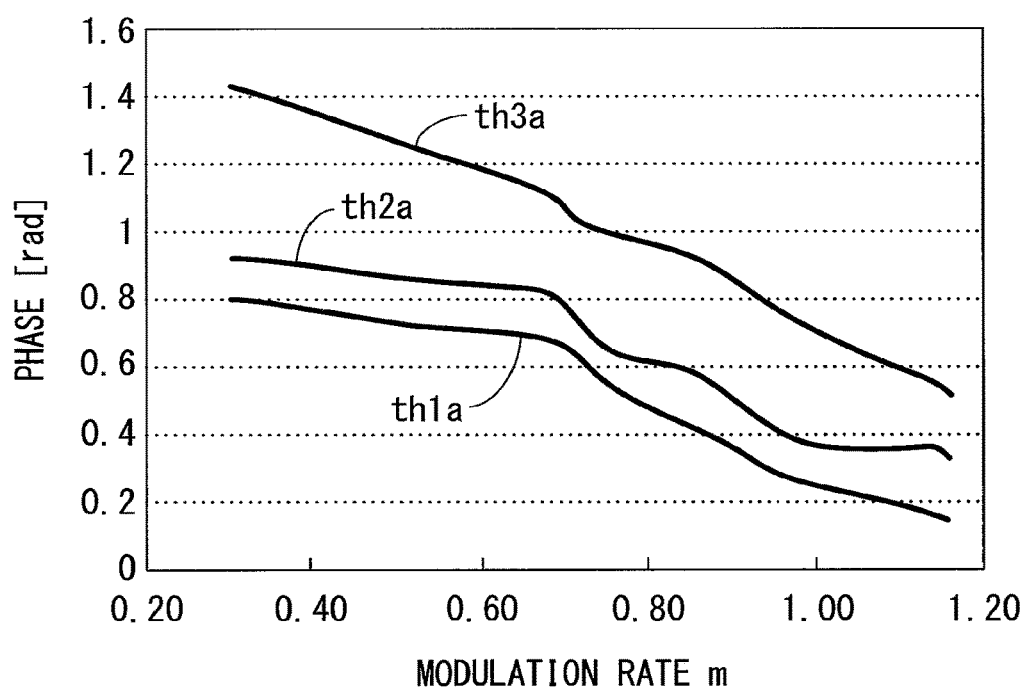
FIG. 8 is a diagram of waveforms of switching pattern phases for each inverter in the drive control apparatus for multiple-winding motor according to embodiment 1 of the present invention.
Figure 9:
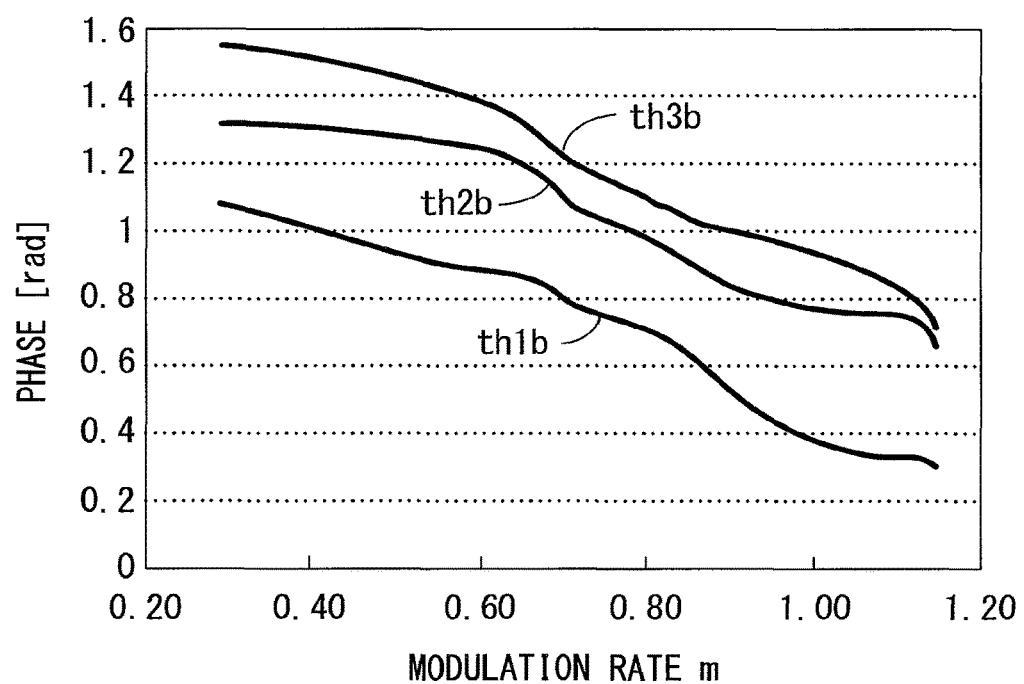
FIG. 9 is a diagram of waveforms of switching pattern phases for each inverter in the drive control apparatus for multiple-winding motor according to embodiment 1 of the present invention.

Hereinafter, the configuration and operation of a drive control apparatus 1 for multiple-winding motor according to embodiment 1 of the present invention will be described with reference to FIG. 1 showing the entire configuration of the drive control apparatus for multiple-winding motor, FIG. 2 showing the details of a part of the configuration, FIG. 3 showing the configuration of the modulation rate phase command generation unit, FIG. 4 showing the configuration of a current equalization controller, FIG. 5 and FIG. 6 illustrating the relationship between a pulse pattern for each inverter and a control carrier, FIG. 7 showing an example of output voltage of each inverter by low-order harmonic eliminating PWM, and FIG. 8 and FIG. 9 showing waveforms of switching pattern phases for each inverter.

FIG. 1 shows the configuration of the entire system including the drive control apparatus 1 for multiple-winding motor in embodiment 1 of the present invention. FIG. 2 is a detailed configuration diagram of a first group inverter 2 in the drive control apparatus 1 for multiple-winding motor. A detailed configuration diagram of a second group inverter 3 is the same as that of the first group inverter 2, and therefore is omitted.

In FIG. 1, the entire system 100 including the drive control apparatus 1 for multiple-winding motor is composed of the drive control apparatus 1 for multiple-winding motor, an external AC power supply 40, a reactor 41, and a motor 5.

The drive control apparatus 1 for multiple-winding motor receives an AC power supply from the external AC power supply 40 via the reactor 41, converts the AC power supply to DC power supply internally, and controls the motor 5 using the DC power supply.

In embodiment 1, a multiple-winding motor having two winding groups is assumed as the motor 5.

Next, the internal configuration of the drive control apparatus 1 for multiple-winding motor will be described with reference to FIG. 1 and FIG. 2.

The drive control apparatus 1 for multiple-winding motor is composed of: an inverter unit 4 including a first group inverter 2 and a second group inverter 3; a control unit 8; and a current sensor 16 for detecting motor current of the motor 5. In embodiment 1, the two first and second group inverters 2 and 3 are provided in accordance with the motor 5 which is a multiple-winding motor having two winding groups.

The first group inverter 2 may be referred to as a first inverter 2, and the second group inverter 3 may be referred to as a second inverter 3, as appropriate. The first inverter 2 and the second inverter 3 may be referred to as inverters as appropriate when collectively mentioned without the need of discriminating them.

The power converters in the present invention are the first group inverter 2 and the second group inverter 3.

FIG. 2 shows the internal configuration of the first inverter 2 of the inverter unit 4, including connection with the external AC power supply 40, the reactor 41, and the motor 5.

The control unit 8 is mainly composed of an output power control unit 81 and a PWM control unit 82.

The output power control unit 81 includes an output voltage phase calculating unit 9, an output voltage determination unit 10, and a modulation rate phase command generation unit 13.

The PWM control unit 82 includes a modulation rate calculation unit 11, a pulse number determination unit 12, a pattern table 14, and gate signal generators 15-1 and 15-2.

The gate signal generator 15-1 for the first inverter 2 and the gate signal generator 15-2 for the second inverter 3 may be referred to as gate signal generators 15 as appropriate when collectively mentioned without the need of discriminating them.

In the first inverter 2, AC input voltage is outputted as isolated DC voltages to respective U, W, W phases, via transformers and diodes in a rectifier circuit unit 6-1. The first inverter 2 converts the DC power to AC power and supplies the AC power to the motor 5. At a part connected to the motor 5, the first inverter 2 is provided with a current sensor 16-1 for detecting motor currents for U, V, W phases of the respective windings.

The first inverter 2 is composed of 5-level inverter circuits for three phases, each of which has two legs (A-leg 7a, B-leg 7b) of a three-phase 3-level inverter of a neutral point clamp type, the two legs being connected in series. Through switching operation of switching devices in each leg, DC voltage rectified by the rectifier circuit unit 6-1 is converted to AC voltage having an arbitrary magnitude and an arbitrary frequency, and the AC voltage is outputted. The first inverter 2 has DC voltage sensors (17-1a to 17-1c) for first group, which detect DC voltages (vdc1a to vdc1c) for respective U, V, W phases outputted from the rectifier circuit unit 6-1.

Although not shown, the configuration of the second inverter 3 is the same as that of the first inverter 2. That is, AC input voltage is outputted as isolated DC voltages to respective U, V, W phases via transformers and diodes of a rectifier circuit unit 6-2. Then, through switching operation of switching devices in each leg of the second inverter 3, the DC voltage is converted to AC voltage having an arbitrary magnitude and an arbitrary frequency, and the AC voltage is outputted. The second inverter 3 has DC voltage sensors (17-2a to 17-2c) for second group, which respectively detect DC voltages (vdc2a to vdc2c) for respective U, V, W phases outputted from the rectifier circuit unit 6-2.

Next, main configurations of the output power control unit 81 and the PWM control unit 82 of the control unit 8 will be described together with the function of each unit.

The output power control unit 81 includes: an output voltage phase calculating unit 9 for calculating a standard phase command value th*ref by integrating a frequency command value Fc for the first and second inverters 2 and 3; and an output voltage determination unit 10 for calculating an amplitude Vp of phase voltage by a V/f pattern from the frequency command value Fc. Further, the output power control unit 81 includes a modulation rate phase command generation unit 13 which calculates the difference between currents flowing through the two first and second inverters 2 and 3 and the two groups of windings of the motor, on the basis of phase current iuvw1 detected by the current sensor 16-1 and flowing through the first inverter 2 and the first group of motor windings, and phase current iuvw2 detected by the current sensor 16-2 and flowing through the second inverter 3 and the second group of motor windings, and generates modulation rate command values (inv1*mod, inv2*mod) and phase command values (inv1*th, inv2*th) for the two first and second inverters 2 and 3 so that the current difference becomes zero.

The PWM control unit 82 includes: the modulation rate calculation unit 11 for calculating a modulation rate mod*ref on the basis of the phase voltage amplitude command value Vp calculated by the output voltage determination unit 10; and the pulse number determination unit 12 for determining a pulse number Pnum on the basis of the frequency command value Fc for the first and second inverters 2 and 3.

Here, the pulse number Pnum is the number of pulses per half cycle, outputted for each leg 7a, 7b, and 2×pulse number corresponds to output voltage for a single phase.

The PWM control unit 82 includes a pattern table 14 as a storage unit which stores, for each number of pulses and for each magnitude of the modulation rate m, switching patterns (th1a, th2a, th3a, ..., thna, th1b, th2b, th3b, ..., thnb) that can reduce harmonics, for each inverter.

As the pattern table 14, the same pattern table is used for the two inverters. However, pattern tables may be respectively provided for the inverters.

It is noted that (th1a, th2a, th3a, ..., thna) is a switching pattern for the A-leg 7a, and (th1b, th2b, th3b, ..., thnb) is a switching pattern for the B-leg 7b. That is, the pattern table 14 stores different switching patterns for the respective legs 7a and 7b, and two kinds of switching patterns are combined to form a switching pattern for two legs.

Further, the PWM control unit 82 includes gate signal generators 15-1 and 15-2 for generating gate signals (gs1, gs2) for controlling switching devices of the two switching legs 7a and 7b in each of the first and second inverters 2 and 3.

Next, the entire operation of the control unit 8 will be described with reference to the drawings.

The output voltage phase calculating unit 9 integrates the frequency command value Fc and generates the phase command value th*ref for the first and second inverters 2 and 3.

The output voltage determination unit 10 calculates the phase voltage amplitude Vp at the frequency command value Fc, from a ratio Kvf between a rated phase voltage amplitude Vrated and a rated electric angle frequency Frated under the assumption that the inverter frequency and induced voltage of the motor are in a certain proportional relationship. That is, Kvf and the phase voltage amplitude command Vp for the first and second inverters 2 and 3 at the inverter frequency command value Fc are calculated by expression (1) and expression (2).

Mathematical 1

$$K_{vf} = V_{rated}/F_{rated} \quad (1)$$

Mathematical 2

$$V_p = Fc \times K_{vf} \quad (2)$$

The modulation rate calculation unit 11 calculates the modulation rate mod*ref by expression (3) from: the phase voltage amplitude command Vp for the first and second inverters 2 and 3 outputted from the output voltage determination unit 10; and average voltage Vdc calculated using DC voltages (first group: vdc1a to vdc1c, second group: vdc2a to vdc2c) for U, V, W phases detected by the voltage sensors 17-1a to 17-1c and 17-2a to 17-2c for the first and second inverters 2 and 3. Then, the modulation rate calculation unit 11 outputs the average DC voltage Vdc and the modulation rate command value mod*ref to the modulation rate phase command generation unit 13.

Mathematical 3

$$\text{mod*ref} = V_p/Vdc \quad (3)$$

The pulse number determination unit 12 determines the pulse number Pnum per half cycle in PWM control, in accordance with the frequency command value Fc for the two first and second inverters 2 and 3. In the case of using inverters having elements slow in switching speed as in capacity inverters, when the frequency command value Fc becomes high, it is necessary to decrease the number of times of switching by decreasing the pulse number Pnum per half cycle in a stepwise manner. In the present embodiment 1, the pattern table 14 stores switching patterns for five kinds of pulse numbers Pnum: 3 pulses, 5 pulses, 7 pulses, 9 pulses, and 11 pulses, and as the frequency command value Fc increases, the pulse number Pnum is switched in the order of 11 pulses, 9 pulses, 7 pulses, 5 pulses, and then 3 pulses.

The frequency command in the present invention is the frequency command value Fc.

When, due to difference between constants of the rectifier circuit units 6-1 and 6-2 of the two first and second inverters 2 and 3 or disturbance such as load variation, a voltage difference occurs between three-phase DC voltage (vdc1a to vdc1c) of the first inverter 2 and three-phase DC voltage (vdc2a to vdc2c) of the second inverter 3, a difference occurs between the amplitudes of voltages outputted from the two first and second inverters 2 and 3, even if the same modulation rate command value mod*ref and the same phase command value th*ref are given. In the case of sinewave voltage, modulation rates obtained by multiplying mod*ref with the ratio of the DC voltage rated value to DC voltage of each of the two first and second inverters 2 and 3 may be given as the modulation rates for the respective inverters. However, in the case of PWM, even if the same amplitude is outputted, deviation occurs between the phases of the fundamental waves by pulse deviation due to dead time or PWM waveform difference depending on the modulation rate, in particular, deviation due to positive/negative direction difference of pulses depending on current direction difference in the vicinity of zero voltage.

In large-capacity inverters having elements slow in switching speed, the dead time is long and thus such a deviation increases, whereby current difference between the two first and second inverters 2 and 3 increases. Therefore, in the modulation rate phase command generation unit 13, by a current equalization controller 18, a modulation rate correction amount and a phase correction amount for each of the two first and second inverters 2 and 3 are calculated so as to eliminate the current difference between the two inverters, and then, on the basis of these correction amounts, modulation rate command values and phase command values for the two first and second inverters 2 and 3 are generated.

The modulation rate command in the present invention is the modulation rate command value, and the phase command in the present invention is the phase command value.

The modulation rate phase command generation unit 13 generates, for the first and second inverters 2 and 3, the modulation rate command values and the phase command values for eliminating the difference between currents flowing through the first and second inverters 2 and 3, using: three-phase current iuvw1 of the first inverter 2 detected by the current sensor 16-1 and three-phase current iuvw2 of the second inverter 3 detected by the current sensor 16-2; and the modulation rate command value mod*ref and the average DC voltage Vdc from the modulation rate calculation unit 11.

Further, the modulation rate phase command generation unit 13 generates a modulation rate command value inv1*mod and a phase command value inv1*th for the first inverter 2, and a modulation rate command value inv2*mod and a phase command value inv2*th for the second inverter 3. Then, the modulation rate phase command generation unit 13 outputs the modulation rate command values inv1*mod1 and inv2*mod to the pattern table 14, and outputs the phase command values inv1*th and inv2*th to the gate signal generators 15-1 and 15-2 for the first and second inverters 2 and 3.

In addition, the modulation rate phase command generation unit 13 performs control for equalizing currents of the first and second inverters 2 and 3, at one or more phases, one or more times per one cycle, and the phase or frequency at which the control is performed is changed in accordance with any of the number of pulses, the modulation rate, the frequency command value, and the switching pattern.

FIG. 3 is a configuration diagram of the modulation rate phase command generation unit 13. In the modulation rate phase command generation unit 13, the current equalization controller 18 calculates the current difference between the groups, from the three-phase currents iuvw1 and iuvw2 flowing through the two inverters and the windings, and outputs a modulation rate correction amount Δmod12 and a phase correction amount Δth12 so that the current difference becomes zero.

FIG. 4 is a configuration diagram of the current equalization controller 18. In FIG. 4, the current equalization controller 18 includes three-phase/two-phase converters 21a and 21b for converting currents of the first inverter 2 and the second inverter 3 from three-phase to two-phase by the phase command value th*ref, to obtain currents on γ–δ control axes. The current equalization controller 18 includes: a C12d controller 22a which outputs a correction amount for performing modulation rate correction, on the basis of the difference (first group−second group: iγ1−iγ2) between γ-axis (d-axis) currents on the control axes of the first and second inverters 2 and 3; and a C12q controller 22b which outputs a correction amount for performing phase correction on the basis of the difference (first group−second group: iδ1−iδ2) between δ-axis (d-axis) currents on the control axes of the first and second inverters 2 and 3. In addition, the current equalization controller 18 includes: a correction amount/modulation rate converter 28 for converting the correction amount obtained by the C12d controller 22a to a modulation rate correction amount, using the DC voltage Vdc; and a correction amount/phase converter 29 for converting the correction amount obtained by the C12q controller 22b to a phase correction amount.

In general, a voltage equation of double-winding IPM in a rotating coordinate system (d–q coordinate system) rotating at a rotational angular frequency ωr in synchronization with a magnetic flux vector of a rotor, is represented by expression (4).

In expression (4), vds1, vqs1, ids1, iqs1 are d-axis and q-axis voltages and d-axis and q-axis currents of the first group winding, and vds2, vqs2, ids2, ids2 are d-axis and q-axis voltages and d-axis and q-axis currents of the second group winding. Ld and Lq are inductances on d-axis and q-axis of each winding, Ra is a winding resistance, Md and Mq are mutual inductances between the windings, and P is a differential operator.

Mathematical 4

$$\begin{bmatrix} v_{ds1} \\ v_{qs1} \\ v_{ds2} \\ v_{qs2} \end{bmatrix} = \begin{bmatrix} R_a + PL_d & -\omega_r L_q & PM_d & -\omega_r M_q \\ \omega_r L_d & R_a + PL_q & \omega_r M_d & PM_q \\ PM_d & -\omega_r M_q & R_a + PL_d & -\omega_r L_q \\ \omega_r M_d & PM_q & \omega_r L_d & R_a + PL_q \end{bmatrix} \cdot \begin{bmatrix} i_{ds1} \\ i_{qs1} \\ i_{ds2} \\ i_{qs2} \end{bmatrix} + \begin{bmatrix} 0 \\ \omega_r \Phi_m \\ 0 \\ \omega_r \Phi_m \end{bmatrix} \quad (4)$$

From expression (4), the voltage difference between the first group winding and the second group winding is calculated as shown by expression (5).

Mathematical 5

$$\begin{bmatrix} v_{ds1} - v_{ds2} \\ v_{qs1} - v_{qs2} \end{bmatrix} = \begin{bmatrix} R_a + P(L_d - M_d) & -\omega_r(L_q - M_q) \\ \omega_r(L_d - M_d) & R_a + P(L_q - M_q) \end{bmatrix} \cdot \begin{bmatrix} i_{ds1} - i_{ds2} \\ i_{qs1} - i_{qs2} \end{bmatrix} \quad (5)$$

As described above, in the case of creating an expression of the relationship of the voltage difference and the current difference between the groups, the expression is represented by only the resistance Ra, the leakage inductance L (Ld−Md, Lq−Mq), and the rotational angular frequency ωr, and thus does not include interference terms (term of PM and term of ωrM in matrix of expression (4)) by which current of the first group winding influences voltage of the second group winding and current of the second group winding influences voltage of the first group winding. Therefore, it is possible to calculate a voltage difference (correction voltage amount) for eliminating the difference current, without considering interference between the windings of the respective groups.

In the above voltage equation, in order to simplify the control, a speed electromotive force is neglected, and only a primary delay (on d-axis, term of (Ld−Md) and Ra, and on q-axis, term of (Lq−Mq) and Ra) is dealt with as a control target.

Specifically, voltage differences (vds1−vds2, vqs1−vqs2) between the two groups are calculated at a desired control response ωc through PI control using a command value of 0 on the basis of the current differences ids1−ids2 and iqs1−iqs2, and then the modulation rate correction amount and the phase correction amount are calculated on the basis of the voltage differences.

In the present embodiment 1, under the assumption that the ideal control coordinate system (γ–δ coordinate system) is the same as the rotating coordinate system (d–q coordinate system) of the motor 5, using iγ1−iγ2, iδ1−iδ2, and a command value of 0, the C12d controller 22a and the C12q controller 22b calculate the voltage differences Vγ1−Vγ2 and Vδ1−Vδ2, respectively. The transfer functions in PI control of the C12d controller 22a and the C12q controller 22b are represented by expression (6) and expression (7).

Mathematical 6

$$C12d(s) = \omega_c \frac{(L_d - M_d)s + R_a}{s} \quad (6)$$

Here, P gain Kp is ωc×(Ld−Md), and I gain Ki is ωc×Ra.

Mathematical 7

$$C12q(s) = \omega_c \frac{(L_q - M_q)s + R_a}{s} \quad (7)$$

Here, P gain Kp is $\omega c \times (Lq-Mq)$, and I gain Ki is $\omega c \times Ra$.

As for the difference current between the γ-axis currents of the respective groups, a value obtained by dividing the voltage difference Vγ1–Vγ2 calculated by the C12d controller 22a by the DC voltage average value Vdc and then multiplying the resultant value by ½, is used as the modulation rate correction amount Δ mod12 for the first and second inverters 2 and 3.

As for the difference current between the δ-axis currents of the respective groups, if the voltage difference Vδ1–Vδ2 calculated by the C12q controller 22b is defined as a voltage correction amount ΔVδ on δ axis, an angle θ between ΔVδ and a voltage absolute value Vγδ on γδ axes is represented by expression (8).

Mathematical 8

$$\theta = a\sin(\Delta V\delta / V\gamma\delta) \quad (8)$$

Here, ΔVδ is assumed to be sufficiently smaller than Vγδ so that influence of the correction amount ΔVδ on Vγδ is negligible. If θ to be calculated by expression (8) is sufficiently small, θ is equivalent to ΔVδ/Vγδ, and therefore a conversion equation from the correction amount Δ Vδ to the phase correction amount Δth12 is represented by expression (9).

Mathematical 9

$$\Delta th12 = \Delta V\delta / V\gamma\delta \quad (9)$$

The ΔVδ is equivalent to the voltage correction amount for the second inverter 3 relative to voltage of the first inverter 2, and therefore the phase correction amount is given to only the second inverter 3.

As shown in FIG. 3, from the modulation rate correction amount Δ mod12 and the phase correction amount Δ th12 obtained by the current equalization controller 18, the modulation rate command value inv1*mod for the first inverter 2, the modulation rate command value inv2*mod for the second inverter 3, the phase command value inv1*th for the first inverter 2, and the phase command value inv2*th for the second inverter 3 are calculated by expression (10).

Mathematical 10

$$\text{inv1*mod} = \text{mod*ref} - \Delta \text{mod12}$$

$$\text{inv2*mod} = \text{mod*ref} + \Delta \text{mod12}$$

$$\text{inv1*}th = th\text{*ref}$$

$$\text{inv2*}th = th\text{*ref} + \Delta th12 \quad (10)$$

The modulation rate command values and the phase command values for the two first and second inverters 2 and 3 are generated by the method described above, and the modulation rate command values are outputted to the pattern table 14 and the phase command values are outputted to the gate signal generator 15.

In the present embodiment 1, the pattern table 14 is provided which enables PWM output for reducing low-order harmonics while maximally effectively utilizing a small number of times of switching, even in the case of using inverters having elements slow in switching speed as in a large-capacity inverter or using inverters required to perform high-speed operation with a small number of times of switching because the carrier cannot be raised for some reason.

The details of the method for deriving the switching pattern will be described later. In an example in which elements slow in switching speed are used, if the frequency at which the equalization current control is performed is increased or the control response is speeded up, the pulse change time is shortened by frequent correction of the modulation rate or the phase, so that the switching might not be able to follow. This can happen in both the case of low-order harmonic eliminating PWM and the case of general triangular wave comparison PWM. In the case of low-order harmonic eliminating PWM, if change in the voltage waveform by the control is too fast, there is a possibility that the horizontally-symmetric and positive-negative-symmetric waveform is deformed, whereby the control becomes unstable, that is, current variation increases. Therefore, in the present embodiment 1, the frequency at which the control is performed is changed in accordance with the number of pulses or the modulation rate in the low-order harmonic eliminating PWM, thereby enabling stable and highly accurate correction.

FIG. 5 and FIG. 6 show the relationship between a pulse pattern and a control carrier in the case of pulse number Pnum=3.

In the case of pulse number Pnum=3, the number of times of switching of the switching legs 7a, 7b is twelve per one cycle. For example, as shown in FIG. 5, the control frequency (carrier) is set to six times the command value frequency, and in accordance with the number of times of 3-level switching, the mountains and valleys of the carrier are set to be located at the zero phases (0, π, 2π) and the peak phases (π/2, 3/2π) of the command value, so that the control is performed at the mountain or valley of the carrier twelve times per one cycle. The control carrier is set as described above in view of the number of times of switching, but the pulse width is broadened at a high modulation rate. Therefore, in such a case of high modulation rate (equivalent to high operation frequency in the case of V/f), as shown in FIG. 6, the control frequency (carrier) is decreased to 5.5 times the command value frequency, and the control is regularly performed at the mountain or valley of the carrier (eleven times per one cycle of the command value). Thus, according to the pulse number Pnum, currents of the first and second inverters 2 and 3 are detected at a phase at which the pulse waveform is supposed to be stable, the correction amounts are calculated so as to eliminate the current difference, and the modulation rate command values and the phase command values for the first and second inverters 2 and 3 are outputted. Therefore, the amplitudes and phases of the PWM waveforms outputted from the two first and second inverters 2 and 3 can be accurately aligned with each other with a small number of times, and as a result, unstable control and increase in loss due to increase in the current difference can be prevented.

In the pattern table 14, a switching pattern that can reduce low-order harmonics in the output voltage is stored for each pulse number Pnum and for each magnitude of the modulation rate m, and switching patterns for the respective inverters are read on the basis of the pulse number Pnum from the pulse number determination unit 12 and the modulation rate command values inv1*mod and inv2*mod for the first inverter 2 and the second inverter 3 from the modulation rate phase command generation unit 13.

Next, the switching patterns and output voltages of the first inverter 2 and the second inverter 3 will be described with reference to FIG. 7.

FIG. 7 shows an example of the relationship between output voltage for a single phase of the 5-level inverter and output voltages of the two switching legs 7a and 7b connected in series, in the case of Pnum=3 pulses.

The two switching legs 7a and 7b for each phase of each of the first and second inverters 2 and 3 output 3-level voltages with three pulses per half cycle on the basis of their respective switching patterns (th1a, th2a, th3a, and th1b, th2b, th3b), and these 3-level voltages are combined to be output voltage for a single phase of the 5-level inverter of each of the first and second inverters 2 and 3.

In the low-order harmonic eliminating PWM method, in the case of pulse number=3, switching patterns th1a, th2a, th3a for the A-leg 7a and switching patterns th1b, th2b, th3b for the B-leg 7b are calculated so as to reduce a harmonic of a specific low order, by expression (11). It is noted that, in expression (11), voltage harmonics of fifth, seventh, eleventh, and thirteenth orders are reduced and fundamental waves are equally allocated for the 3-level inverters of two legs.

Mathematical 11

$$\begin{cases} \frac{4}{\pi}(\cos th1a - \cos th2a + \cos th3a) = m \\ \frac{4}{\pi}(\cos th1b - \cos th2b + \cos th3b) = m \\ \cos 5th1a - \cos 5th2a + \cos 5th3a + \cos 5th1b - \cos 5th2b + \cos 5th3b = 0 \\ \cos 7th1a - \cos 7th2a + \cos 7th3a + \cos 7th1b - \cos 7th2b + \cos 7th3b = 0 \\ \cos 11th1a - \cos 11th2a + \cos 11th3a + \cos 11th1b - \cos 11th2b + \cos 11th3b = 0 \\ \cos 13th1a - \cos 13th2a + \cos 13th3a + \cos 13th1b - \cos 13th2b + \cos 13th3b = 0 \end{cases} \quad (11)$$

FIG. 8 and FIG. 9 show the waveforms of phases indicating the switching patterns calculated by the above expression (11). FIG. 8 is the switching phase waveform for the A-leg 7a, and FIG. 9 is the switching phase waveform for the B-leg 7b.

In the case of 3 pulses, the number of switching phases of each of the two switching legs is three per ¼ cycle, and the total number is six, which corresponds to the degree of freedom of equations for calculating switching phases in the low-order harmonic reducing PWM. In the present embodiment 1, since the amplitudes of fundamental waves to be outputted are equally allocated for the switching legs 7a and 7b, the degree of freedom that can be used for harmonics is 4, and therefore a configuration of eliminating voltage harmonics of fifth, seventh, eleventh, and thirteenth orders is employed. However, the phases may be calculated with such a condition that voltage harmonics of other orders are eliminated, the pulse width is limited, or the fundamental wave amplitudes are not equally allocated.

The gate signal generator 15-1 for the first inverter 2 and the gate signal generator 15-2 for the second inverter 3 read switching patterns from the pattern table on the basis of the modulation rate command values inv1*mod and inv2*mod for the respective first and second inverters 2 and 3. Then, on the basis of the switching patterns for the switching legs 7a and 7b and the phase command values inv1*th and inv2*th, the gate signal generator 15 generates a gate signal for turning on or off the gate of each switching device, to perform switching thereof, thereby outputting 5-level output voltage described in FIG. 7, to each phase.

In the present embodiment 1, the control for equalizing currents of the first and second inverters 2 and 3 is performed at the mountain or valley of the control carrier set on the basis of the number of pulses, but may be controlled at a phase at which the pulse output is stable. Specifically, the phase at which the control is performed may be changed in accordance with the modulation rate, the output frequency, or the pulse pattern instead of the number of pulses, or a pulse phase of the pulse pattern may be used therefor without providing the control carrier. It is noted that, since the output frequency is a value obtained by converting the unit of the frequency command value Fc and calculated by multiplying a constant, the frequency command value may be used instead of the output frequency.

The response of calculation of the modulation rate correction amount and the phase correction amount may be set to be lower than the output frequency. Thus, erroneous correction by influence of variation in the bus voltage (in the present embodiment 1, DC voltage for each phase oscillates at 2f; f is the output frequency) or variation in torque ripple (which oscillates at 6f; f is the output frequency) due to the dead time, is difficult to occur, and therefore stable correction can be performed.

As described above, the control of generating the modulation rate command values and the phase command values to an extent to which the fundamental waves of output voltages (after dead times are added) of the first and second inverters 2 and 3 coincide with each other at voltage pattern level so as to equalize currents of the two first and second inverters 2 and 3, is effectively performed at a timing when the pulse becomes stable. Thus, even with a small number of times of control (low control load), and even with a small number of times of switching, it is possible to reduce harmonics and prevent occurrence of a current difference even if a voltage difference occurs between the first and second inverters 2 and 3 (the phase difference between the output voltage fundamental waves is smaller than 0.01 degrees so that there is almost no influence of harmonic voltage difference), whereby the motor control can be prevented from becoming unstable due to mutual interference by magnetic coupling between windings caused by current imbalance.

In particular, a motor having a small number of poles and a strong coupling between windings (small magnetic flux leakage) has a problem that, even by a slight voltage amplitude difference (several % of the rated value) between the windings or a phase difference corresponding to a dead time in the rated frequency operation, the current difference between the windings becomes great, and current variation is likely to occur. By applying the invention of the present embodiment 1, this voltage amplitude difference can be suppressed to ¹⁄₁₀ to ¹⁄₁₀₀ or less, and the current difference between the windings can be reduced both in fundamental waves and harmonics.

Although DC voltage variation is not described above, in the case of triangular wave comparison PWM in which the command value frequency and the carrier are not in an integer multiple relationship as in asynchronous PWM, there is a problem that, when the number of times of switching is small, due to discrepancy between those frequencies, DC voltage oscillates at an uncertain low frequency also during acceleration, and the current difference is likely to increase due to the oscillation. By applying the invention of the present embodiment 1, in low-order harmonic eliminating PWM, a waveform that is symmetric between positive and negative and is synchronized with the frequency of the command value is obtained, and therefore the above problem does not arise.

In the case of using low-order harmonic eliminating PWM, PWM output is performed on the basis of a fundamental wave pulse pattern prepared in advance for reducing harmonics, and therefore, if the above control is performed at a faster response than the fundamental wave as in the conventional case or the frequency at which the control is performed is increased, the PWM waveform which is symmetric between positive and negative and horizontally symmetric in ¼ cycle is deformed, so that the control might become unstable. However, as described in the present embodiment, by setting the control carrier in accordance with the number of pulses (the control carrier may be set in accordance with the modulation rate, the output frequency, or the pulse pattern, besides the number of pulses) and performing the control at the mountain or the valley thereof, i.e., performing the control at such a phase that the pulse becomes stable, the influence on the PWM control from the control for eliminating a current difference among a plurality of winding groups can be reduced, and the motor drive control can be stably and accurately performed.

Further, the present embodiment is applicable also in the case of using feedforward control in which motor application voltage is uniquely determined by the rotation rate, the circuit constant, and the like as in V/f control. Therefore, without the need of voltage margin in control, the output voltage range of the inverters can be maximally utilized, and stable control can be performed in which torque ripple and the like caused by current imbalance due to torque variation or voltage variation in control of a high-voltage motor are reduced.

As described above, in the drive control apparatus for multiple-winding motor of embodiment 1, the control unit includes: the output voltage determination unit; the output voltage phase calculating unit; the modulation rate phase command generation unit which calculates a modulation rate correction amount and a phase correction amount for equalizing currents flowing through respective windings of the multiple-winding AC motor, on the basis of currents of the inverters, and generates a modulation rate command and a phase command for controlling each inverter, on the basis of the calculated correction amounts; the modulation rate calculation unit; the pulse number determination unit for determining the number of pulses per half cycle of PWM control on the basis of the frequency command; the pattern table for storing switching patterns for reducing low-order harmonics in output voltage; and the gate signal generator for generating a gate signal for driving each switching device, using the switching pattern from the pattern table, on the basis of the modulation rate, the number of pulses, and the output voltage phase, wherein the modulation rate phase command generation unit performs control for equalizing currents of power converters, and the phase or frequency at which the control is performed is changed in accordance with the number of pulses. Therefore, even in the case of using inverters having switching devices slow in switching speed, it is possible to perform PWM control with harmonics reduced while maximally utilizing a small number of times of switching, and perform highly accurate correction of imbalance among voltage phases and amplitudes of a plurality of inverters.

In addition, in the drive control apparatus for multiple-winding motor of embodiment 1, since it is possible to perform PWM control with harmonics reduced while maximally utilizing a small number of times of switching even in the case of using inverters having switching devices slow in switching speed, the control device can be downsized and the life thereof can be prolonged.

Embodiment 2

In drive control apparatus for multiple-winding motor of embodiment 2, a current reference value is set, and currents of inverters are controlled so that the current of each inverter coincides with the current reference value, thereby equalizing currents flowing through respective windings of a multiple-winding AC motor.

Figure 10:
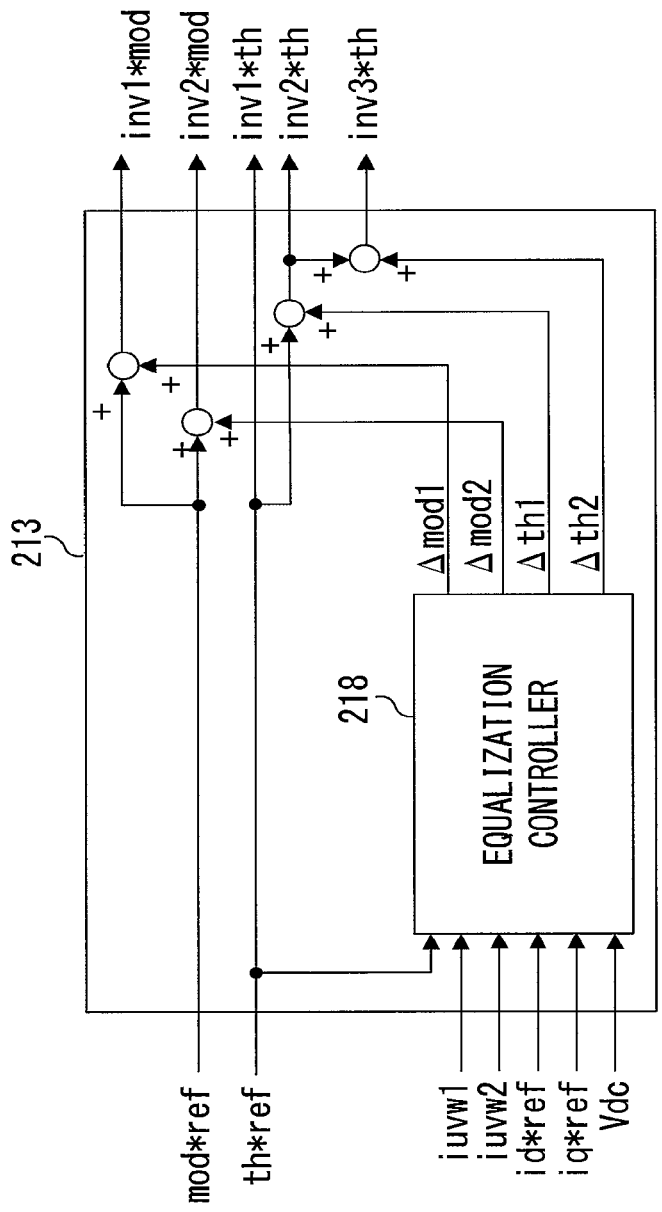
FIG. 10 is a configuration diagram of a modulation rate phase command generation unit in a drive control apparatus for multiple-winding motor according to embodiment 2 of the present invention.
Figure 11:
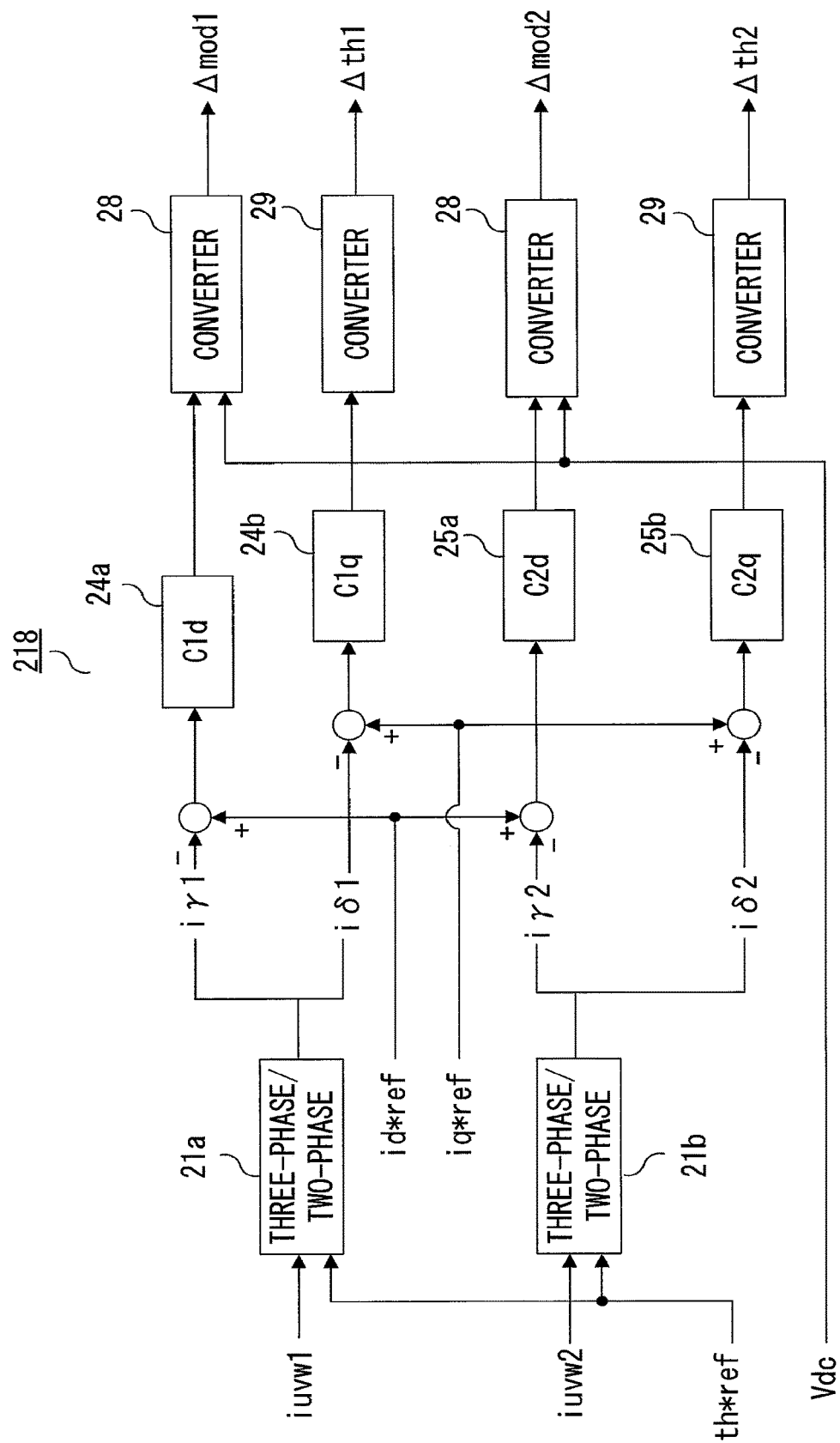
FIG. 11 is a configuration diagram of a current equalization controller in the drive control apparatus for multiple-winding motor according to embodiment 2 of the present invention.

Hereinafter, the configuration and operation of the drive control apparatus for multiple-winding motor in embodiment 2 will be described, focusing on a difference from embodiment 1, with reference to FIG. 10 showing the configuration of a modulation rate phase command generation unit and FIG. 11 showing the configuration of a current equalization controller. In FIGS. 10 and 11, the components that are the same as or correspond to those in FIGS. 3 and 4 are denoted by the same reference characters.

In the description in embodiment 2, the drawings shown in embodiment 1 will be referred to, as necessary.

The configuration of the drive control apparatus for multiple-winding motor in embodiment 2 is basically the same as that shown in FIG. 1 and FIG. 2 in embodiment 1, and is different in the configuration in the modulation rate phase command generation unit.

In the description in embodiment 2, the drive control apparatus for multiple-winding motor, the modulation rate phase command generation unit, and the current equalization controller are respectively denoted by 201, 213, 218, for the purpose of discrimination from embodiment 1.

FIG. 10 shows the configuration of the modulation rate phase command generation unit 213 in the present embodiment 2. In FIG. 10, a difference from the configuration in FIG. 3 in embodiment 1 is that, at the input to the modulation rate phase command generation unit 213, current reference values id*ref and iq*ref are added as input to the current equalization controller 218.

In embodiment 2, instead of performing control so that the current difference between the two first and second inverters 2 and 3 becomes zero on the control axes ($\gamma$–$\delta$ axes) as in embodiment 1, control is performed so that, on $\gamma$–$\delta$ axes, $\gamma$-axis currents and $\delta$-axis currents of the respective inverters respectively become the same current reference value id*ref and the same current reference value iq*ref, whereby the currents of these inverters can be equalized.

FIG. 11 shows the configuration of the current equalization controller 218 in the modulation rate phase command generation unit 213. In FIG. 11, the configuration is the same as in embodiment 1, except a configuration described below.

The current equalization controller 218 includes: a C1d controller 24a which receives the difference between $\gamma$ current i$\gamma$1 of the first inverter 2 and the current reference value id*ref and calculates a $\gamma$-axis voltage correction amount ΔVγ1 for the first inverter 2; and a C1q controller 24b which receives the difference between δ current iδ1 of the first inverter 2 and the current reference value iq*ref and calculates a δ-axis voltage correction amount ΔVδ1 for the first inverter 2. Similarly, the current equalization controller 218 includes: a C2d controller 25a and a C2q controller 25b for calculating a γ-axis voltage correction amount ΔVγ2 and a δ-axis voltage correction amount ΔVδ2 for the second inverter 3. Further, the current equalization controller 218 includes correction amount/modulation rate converters 28 for respectively calculating modulation rate correction amounts Δ mod1 and Δmod2 on the basis of the γ-axis voltage correction amounts ΔVγ1 and ΔVγ2 calculated by the C1d controller 24a and the C1q controller 24b, and the average DC voltage Vdc. Further, the current equalization controller 218 includes correction amount/phase converters 29 for respectively calculating phase correction amounts Δth1 and Δth2 on the basis of Δ-axis voltage correction amounts ΔVδ1 and ΔVδ2 in the same manner as in embodiment 1.

The current reference values id*ref and iq*ref may be the average values of the γ-axis current and the δ-axis current at present, which are obtained by adding or subtracting half the difference between the current values of the two first and second inverters 2 and 3 to or from the respective inverter currents. Alternatively, for example, for the first and second inverters 2 and 3, the d-axis current reference value id*ref may be set to a command value for power factor control, and the q-axis current reference value iq*ref may be set to a command value calculated from a torque command or the like.

If id*ref and iq*ref are assumed to be the γ-axis average current and the δ-axis average current of the two first and second inverters 2 and 3, the voltage correction amounts ΔVγ1, ΔVγ2, ΔVδ1, ΔVδ2 are represented by expression (12), and can be calculated from expression (13).

Mathematical 12

$$\Delta V\gamma 1 = V_{\gamma 1} - V_{d*ref}$$

$$\Delta V\delta 1 = V_{\delta 1} - V_{q*ref}$$

$$\Delta V\gamma 2 = V_{\gamma 2} - V_{d*ref}$$

$$\Delta V\delta 2 = V_{\delta 2} - V_{q*ref} \tag{12}$$

Mathematical 13

$$\begin{bmatrix} V_{\gamma 1} - V_{d*ref} \\ V_{\delta 1} - V_{q*ref} \\ V_{\gamma 2} - V_{d*ref} \\ V_{\delta 2} - V_{q*ref} \end{bmatrix} = \begin{bmatrix} R_s + PL_d & -\omega_r L_q & 0 & 0 \\ \omega_r L_d & R_s + PL_q & 0 & 0 \\ 0 & 0 & R_s + PL_d & -\omega_r L_q \\ 0 & 0 & \omega_r L_d & R_s + PL_q \end{bmatrix} \cdot \begin{bmatrix} i_{\gamma 1} - i_{d*ref} \\ i_{\delta 1} - i_{q*ref} \\ i_{\gamma 2} - i_{d*ref} \\ i_{\delta 2} - i_{q*ref} \end{bmatrix} \tag{13}$$

As in embodiment 1, in expression (13), only the primary delay (RL circuit part) is dealt with as a control target. Through PI control (C1d controller 24a, C1q controller 24b) based on the γ-axis and δ-axis currents iγ1 and iδ1 of the first inverter 2 and the command values id*ref and iq*ref, the voltage correction amounts ΔVγ1 and ΔVδ1 for the first inverter 2 can be calculated at a desired control response ωc. Through PI control (C2d controller 25a, C2q controller 25b) based on the γ-axis and δ-axis currents iγ2 and iδ2 of the second inverter 3 and the command values id*ref and iq*ref, the voltage correction amounts ΔVγ2 and ΔVδ2 for the second inverter 3 can be calculated at a desired control response ωc. On the basis of these values, the modulation rate correction amounts Δmod1 and Δ mod2 and the phase correction amounts Δth1 and Δth2 can be calculated.

In the above case, the transfer functions of the PI controllers (C1d controller 24a, C1q controller 24b, C2d controller 25a, C2q controller 25b) are represented by expression (14) and expression (15).

Mathematical 14

$$C1d(s) = C2d(s) = \omega_c \frac{L_d s + R_a}{s} \tag{14}$$

Here, P gain Kp is ωc×Ld, and I gain Ki is ωc×Ra.

Mathematical 15

$$C1q(s) = C2q(s) = \omega_c \frac{L_q s + R_a}{s} \tag{15}$$

Here, P gain Kp is ωc×Lq, and I gain Ki is ωc×Ra.

As described above, the d-axis current reference value id*ref and the q-axis current reference value iq*ref may be set to desired values as in vector control, and a correction amount from the V/f pattern voltage may be calculated.

However, in the case where a deviation from each reference value is great, the stability might be deteriorated as compared to the case of calculating the respective voltage correction amounts so as to reach the average value of the two first and second inverters 2 and 3. In such a case, at the start of control, the d-axis current reference value id*ref and the q-axis current reference value iq*ref are respectively set to the average values of γ currents and δ currents of the two first and second inverters 2 and 3. Then, the respective reference values are changed to desired command values with a primary delay or a secondary delay, whereby it is possible to control voltages of the two inverters so as to reach the desired command values while reducing the difference current between the two first and second inverters 2 and 3. In particular, in this case, it is desirable that response in changing the reference values to the desired values is slower than response of the C1d controller 24a, the C1q controller 24b, the C2d controller 25a, and the C2q controller 25b.

As shown in FIG. 10, the modulation rate command values inv1*mod and inv2*mod and the phase command values inv1*th and inv2*th for the two first and second inverters 2 and 3 are calculated by expression (16) from the modulation rate command value mod*ref inputted from the modulation rate calculation unit 11, the phase command value th*ref from the output voltage phase calculating unit 9, and the modulation rate correction amounts Δ mod1 and Δ mod2 and the phase correction amounts Δth1 and Δth2 calculated as described above.

Mathematical 16

$$inv1^*mod = mod^*ref + \Delta mod1$$
$$inv2^*mod = mod^*ref + \Delta mod2$$
$$inv1^*th = th^*ref + \Delta th1$$
$$inv2^*th = th^*ref + \Delta th2 \quad (16)$$

As described above, the control of generating the modulation rate command values and the phase command values so that the amplitudes and phases of the fundamental waves of output voltages (after dead times are added) of the first and second inverters 2 and 3 coincide with each other at voltage pattern level so as to equalize currents of the two first and second inverters 2 and 3, is effectively performed at a timing when the pulse becomes stable. Thus, even with a small number of times of control (low control load), and even with a small number of times of switching, it is possible to reduce harmonics. In addition, it is possible to prevent occurrence of a current difference even if a voltage difference occurs between the inverters, and the motor control can be prevented from becoming unstable due to mutual interference by magnetic coupling between windings caused by current imbalance.

In particular, even in a motor having a small number of poles and a strong coupling between windings, loss due to current imbalance can be suppressed in both fundamental waves and harmonics. In addition, it is possible to perform control while keeping the currents and the frequencies in the respective winding groups at control values that are optimum for driving.

Although DC voltage variation is not described above, in the case of triangular wave comparison PWM in which the command value frequency and the carrier are not in an integer multiple relationship as in asynchronous PWM, there is a problem that, when the number of times of switching is small, due to discrepancy between those frequencies, DC voltage oscillates at an uncertain low frequency also during acceleration, and the current difference is likely to increase due to the oscillation. By applying the invention of the present embodiment 2, in low-order harmonic eliminating PWM, a waveform that is symmetric between positive and negative and is synchronized with the frequency of the command value is obtained, and therefore the above problem does not arise.

As described above, in the drive control apparatus for multiple-winding motor of embodiment 2, a current reference value is set, and currents of the inverters are controlled so that the current of each inverter coincides with the current reference value, thereby equalizing currents flowing through the respective windings of the multiple-winding AC motor. Therefore, even in the case of using inverters having switching devices slow in switching speed, it is possible to perform PWM control with harmonics reduced while maximally utilizing a small number of times of switching, and perform highly accurate correction of imbalance among voltage phases and amplitudes of a plurality of inverters.

Embodiment 3

In a drive control apparatus for multiple-winding motor of embodiment 3, one of inverters is used as a reference power converter, and currents of the other inverters are controlled so as to coincide with current of the reference power converter, thereby equalizing currents flowing through respective windings of a multiple-winding AC motor.

Figure 12:
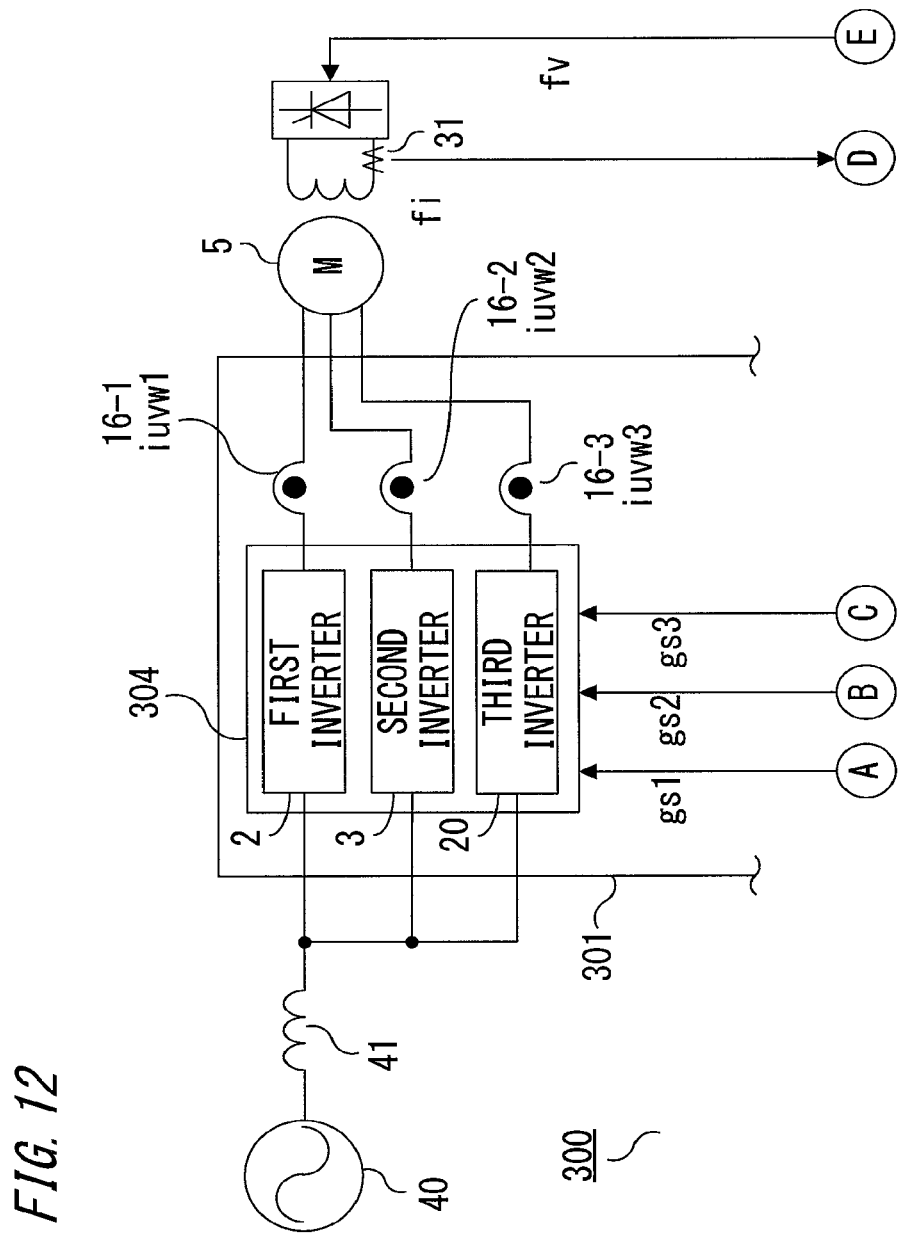
FIG. 12 is a diagram showing the entire configuration of a drive control apparatus for multiple-winding motor in embodiment 3 of the present invention.
Figure 13:
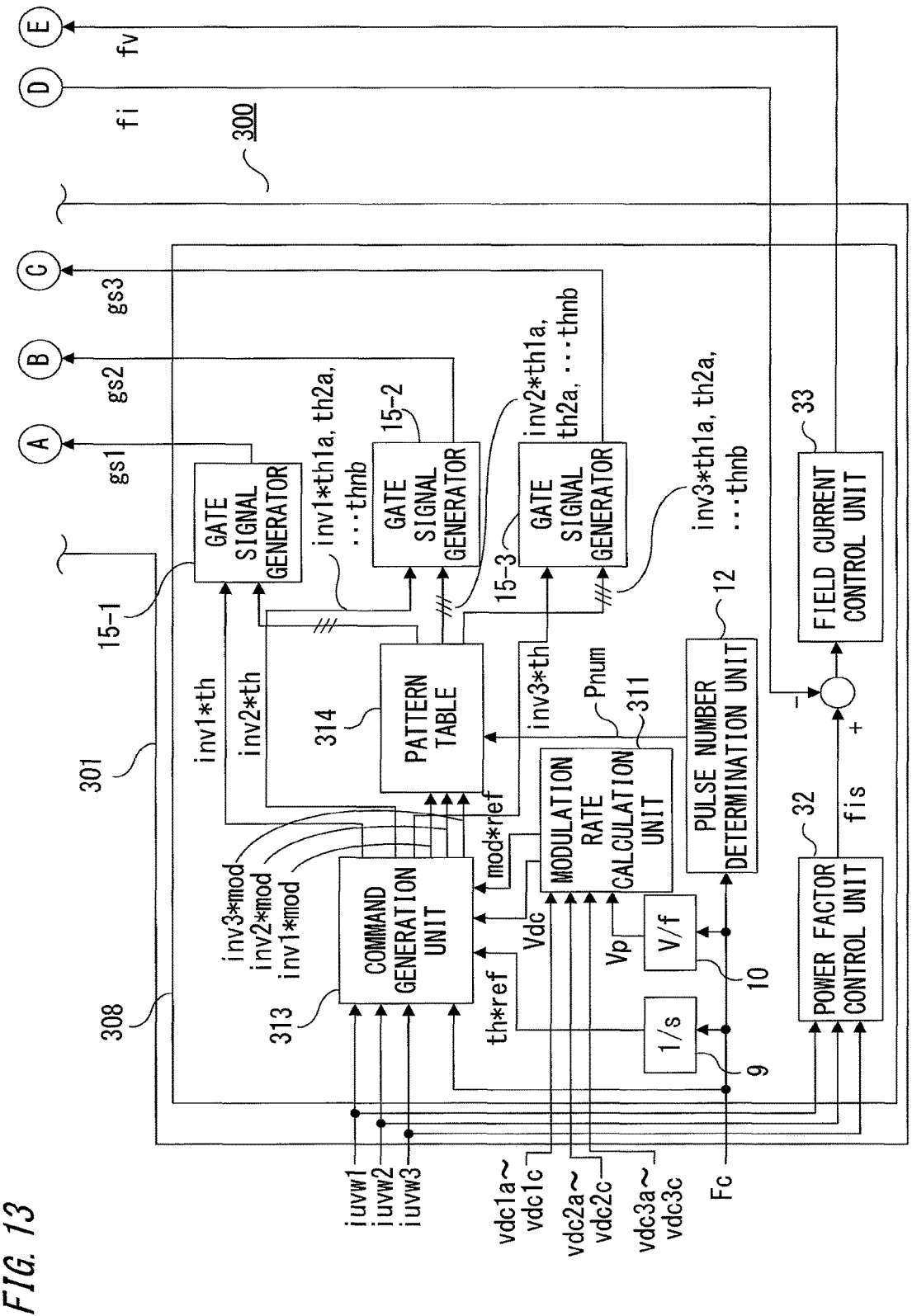
FIG. 13 is a diagram showing the entire configuration of the drive control apparatus for multiple-winding motor in embodiment 3 of the present invention.
Figure 14:
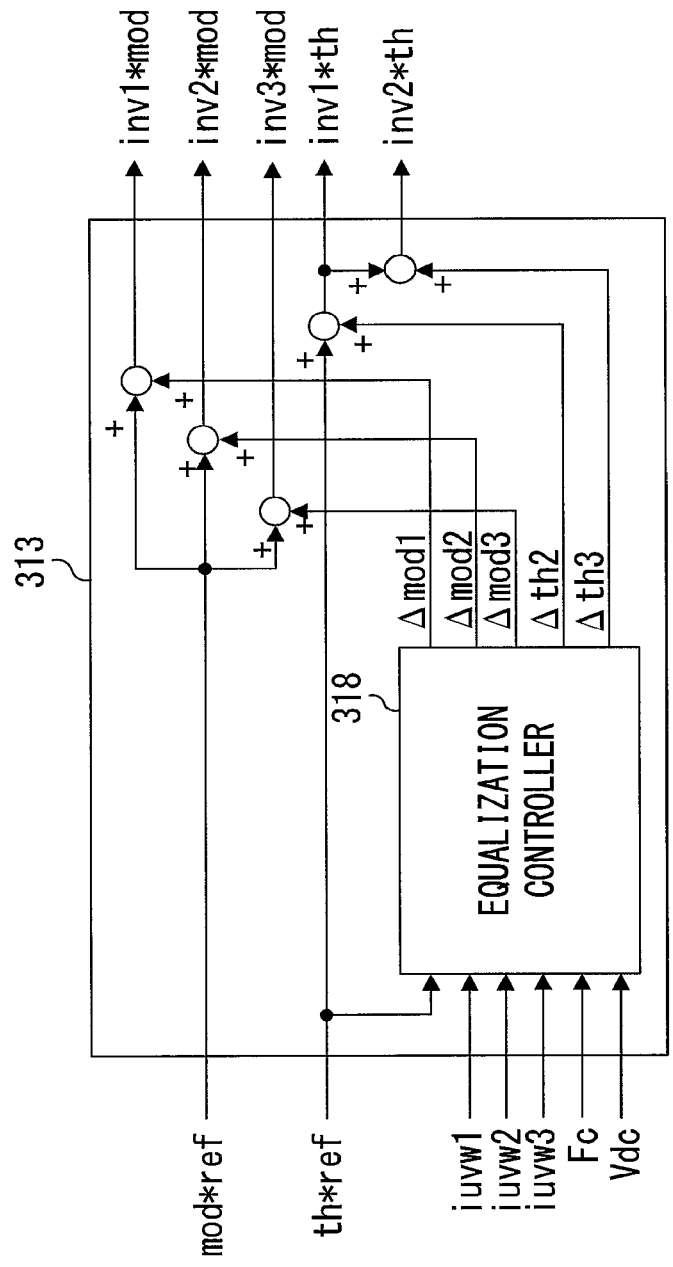
FIG. 14 is a configuration diagram of a modulation rate phase command generation unit in the drive control apparatus for multiple-winding motor according to embodiment 3 of the present invention.
Figure 15:
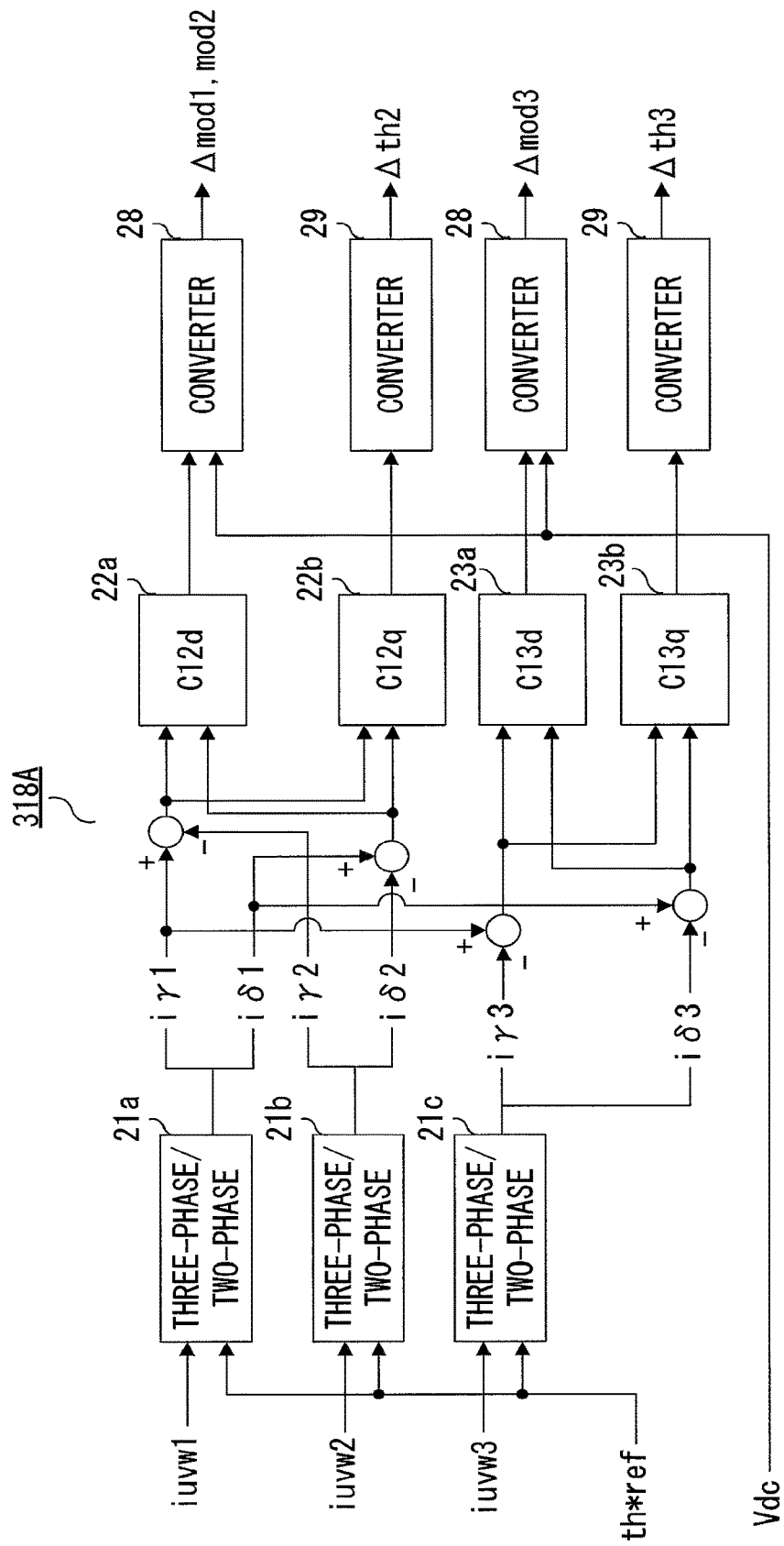
FIG. 15 is a configuration diagram of a current equalization controller in the drive control apparatus for multiple-winding motor according to embodiment 3 of the present invention.
Figure 16:
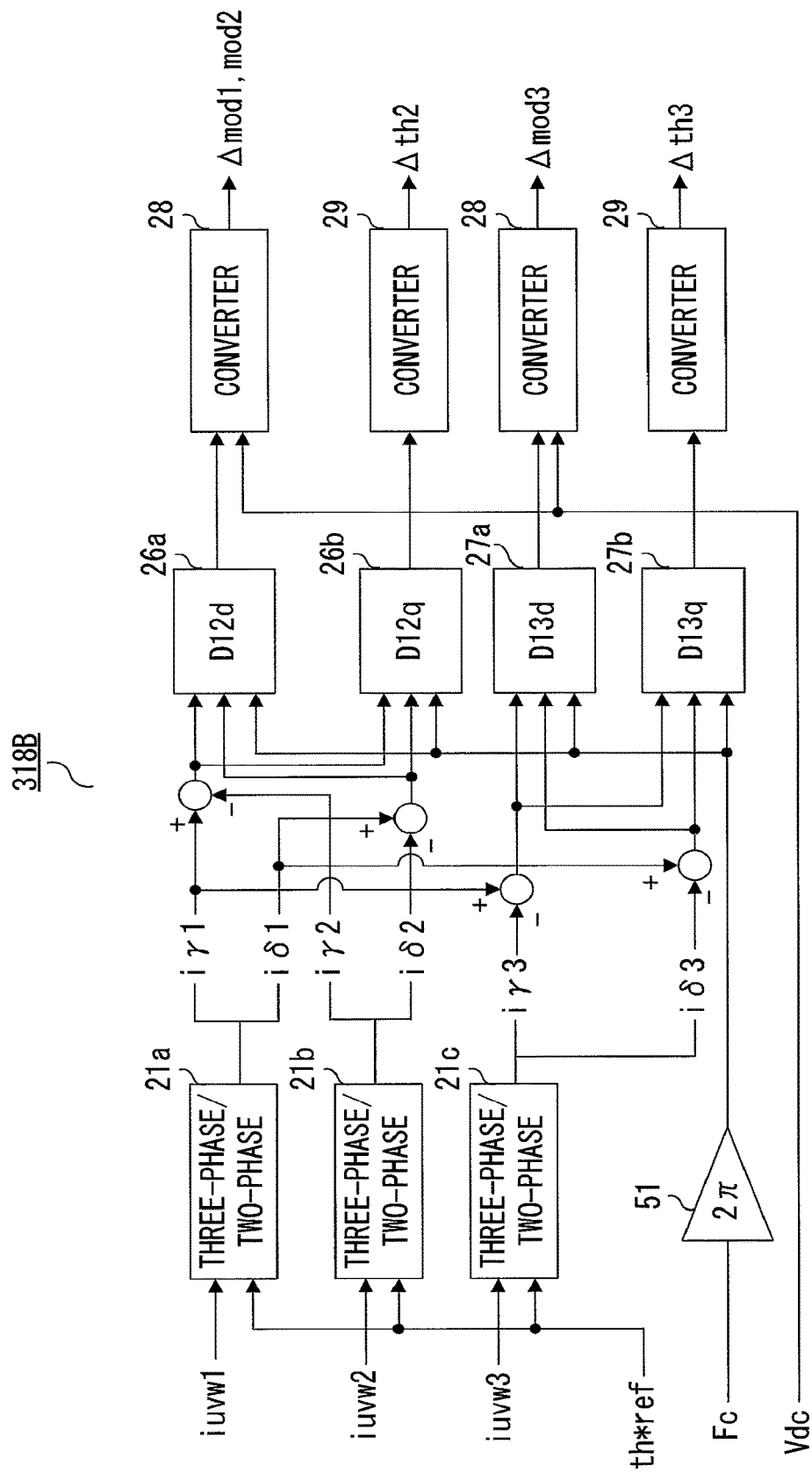
FIG. 16 is a configuration diagram of a current equalization controller in the drive control apparatus for multiple-winding motor according to embodiment 3 of the present invention.
Figure 17:
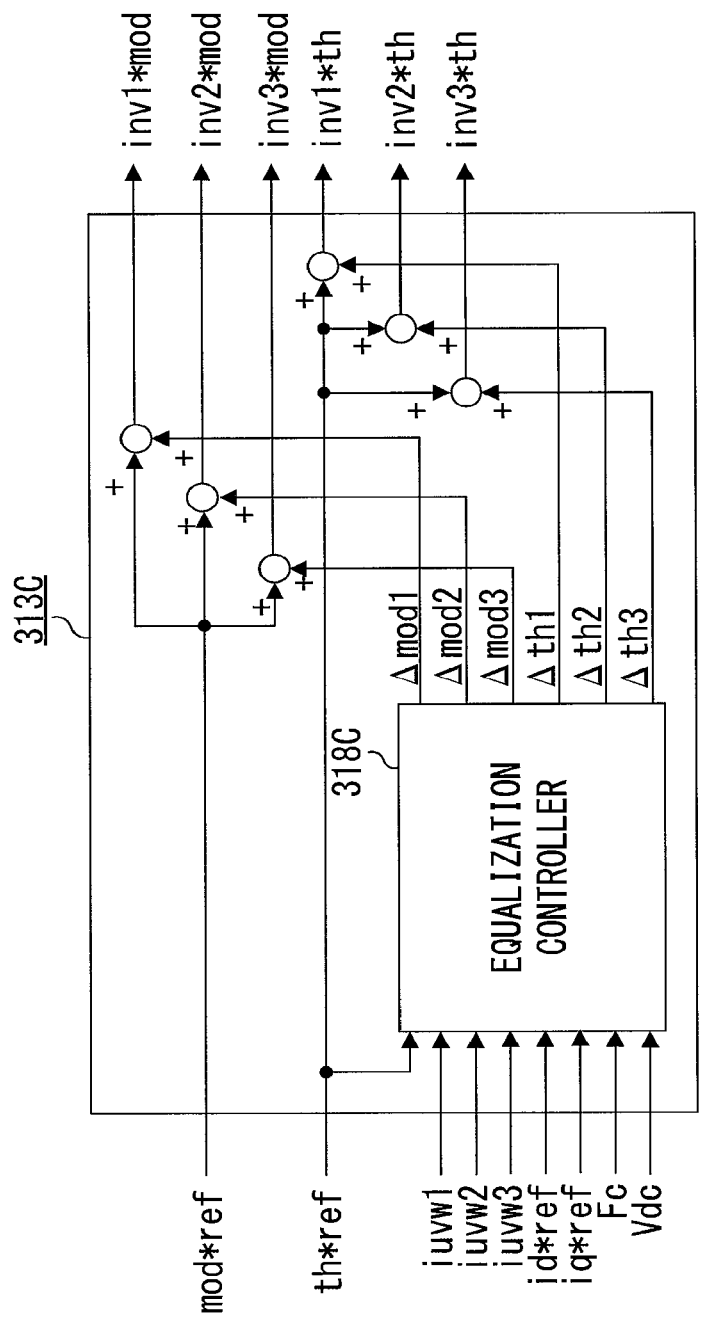
FIG. 17 is a configuration diagram of a modulation rate phase command generation unit in the drive control apparatus for multiple-winding motor according to embodiment 3 of the present invention.
Figure 18:
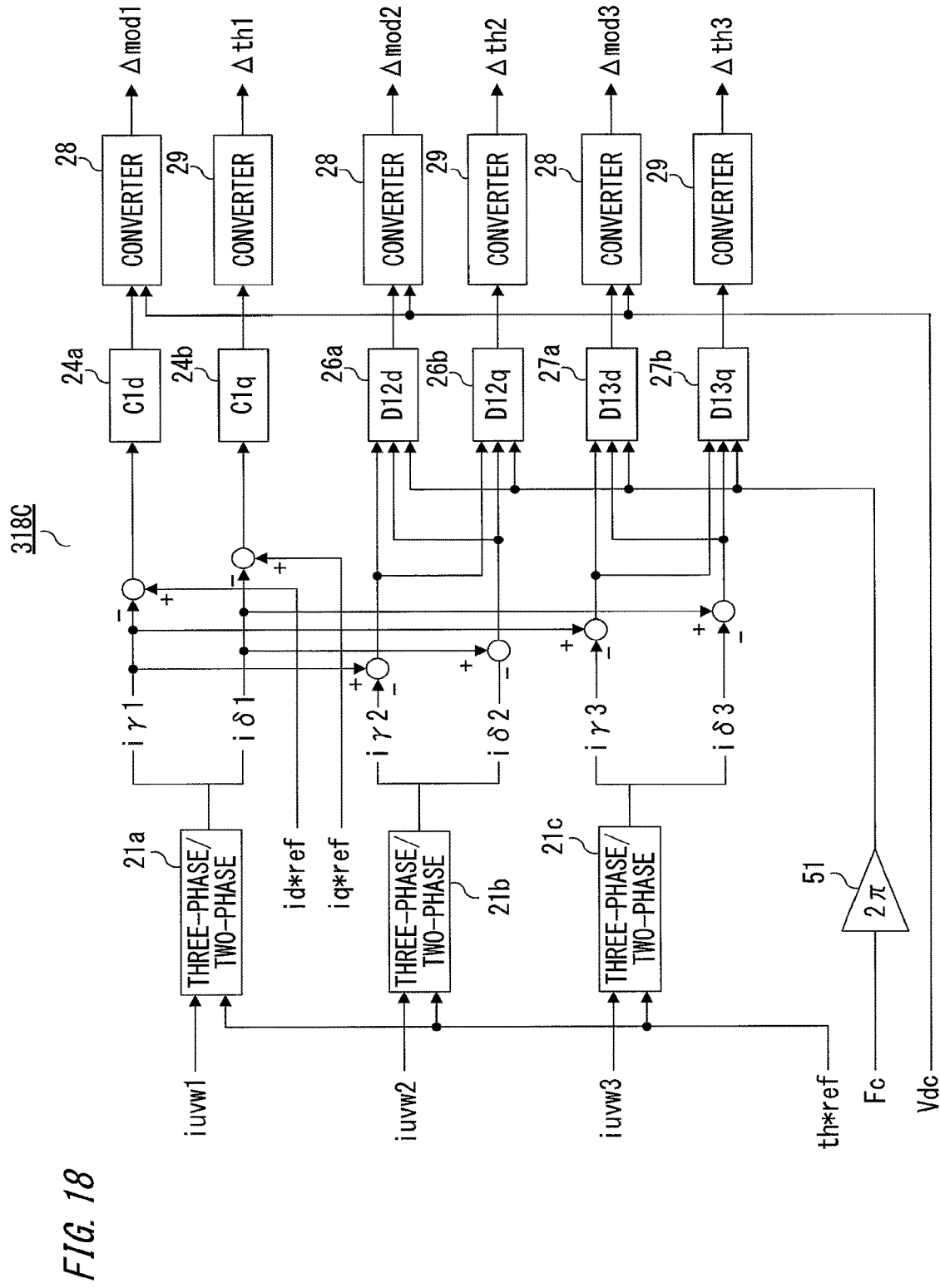
FIG. 18 is a configuration diagram of a current equalization controller in the drive control apparatus for multiple-winding motor according to embodiment 3 of the present invention.

Hereinafter, the configuration and operation of the drive control apparatus for multiple-winding motor in embodiment 3 will be described, focusing on a difference from embodiments 1 and 2, with reference to FIG. 12 and FIG. 13 showing the entire configuration of the drive control apparatus for multiple-winding motor, FIG. 14 and FIG. 17 showing the configuration of a modulation rate phase command generation unit, and FIG. 15, FIG. 16, and FIG. 18 showing the configuration of a current equalization controller. In FIG. 12 to FIG. 18, the components that are the same as or correspond to those in the drawings in embodiments 1 and 2 are denoted by the same reference characters.

FIG. 12 and FIG. 13 show the configuration of the entire system including the drive control apparatus 301 for multiple-winding motor in embodiment 3 of the present invention.

In FIG. 12 and FIG. 13, the entire system 300 including the drive control apparatus 301 for multiple-winding motor is composed of the drive control apparatus 301 for multiple-winding motor, the external AC power supply 40, the reactor 41, and a motor 305.

The drive control apparatus 301 for multiple-winding motor receives an AC power supply from the external AC power supply 40 via the reactor 41, converts the AC power supply to DC power supply internally, and controls the motor 305 using the DC power. As the motor 305, a salient-pole synchronous motor of a field winding type having three groups of three-phase windings is assumed.

The configuration of the drive control apparatus for multiple-winding motor in embodiment 3 is basically the same as that in FIG. 1 and FIG. 2 in embodiment 1, but the motor 305 has three groups of three-phase windings and the relevant configuration of the control unit 308 is partially different.

In the description in embodiment 3, the drive control apparatus for multiple-winding motor, the control unit, the modulation rate phase command generation unit, the pattern table, and the current equalization controller are respectively denoted by 301, 308, 313, 314, 318, for the purpose of discrimination from embodiments 1 and 2.

Next, the configuration of the drive control apparatus 301 for multiple-winding motor in embodiment 3 will be described about a specific difference from the drive control apparatus 1 for multiple-winding motor in embodiment 1.

In FIG. 12 and FIG. 13, a third (third group) inverter 20 is added in an inverter unit 304. The third-group inverter 20 may be referred to as a third inverter 20 as appropriate.

The power converters of the present invention are the first group inverter 2, the second group inverter 3, and the third group inverter 20.

Regarding the modulation rate calculation unit 311, in FIG. 1 and FIG. 2 showing the configuration in embodiments 1 and 2, three-phase DC voltages (vdc1$a$ to vdc1$c$, vdc2$a$ to vdc2$c$) of two inverters are inputted, but in the modulation rate calculation unit 311, three-phase DC voltages (vdc3$a$ to vdc3$c$) of the third inverter 20 are newly added as input.

A current sensor 16-3 is provided for detecting three-phase current flowing through the third inverter 20 and the third winding group of the motor 305, and in the modulation rate phase command generation unit 313, the three-phase current iuvw3 of the third inverter 20 is newly added as input, and a modulation rate command value inv3*mod and a phase command value inv3*th for the third inverter 20 are newly added as output. Therefore, the control configuration in the current equalization controller 318 in the modulation rate phase command generation unit 313 is also different from embodiments 1 and 2, and will be described later.

Also in the pattern table 314, as in the modulation rate phase command generation unit 313, the modulation rate command value inv3*mod for the third inverter 20 is added as input, and on the basis thereof, a pulse pattern (inv3*th1a, inv3*th2a, . . . , inv3*thnb) for the third inverter 20 is extracted and outputted to a gate signal generator 15-3 for the third inverter 20.

The gate signal generator 15-3 for the third inverter 20 generates a gate signal (gs3) for controlling each switching device of the third inverter 20, on the basis of the switching pattern from the pattern table 314 and the inverter phase command value inv3*th.

Further, a current sensor 31 is added which detects current flowing through the field winding, a power factor control unit 32 is added which converts the three-phase currents iuvw1, iuvw2, iuvw3 of the three inverters to currents in the control coordinate system (γ–δ axes) for each group, and outputs a field current command value so that the sum of γ-axis currents of the respective winding groups becomes a γ-axis current command value for achieving a desired power factor, and a field current control unit 33 is added which controls field winding application voltage so that the field current detected by the current sensor 31 becomes the field current command value from the power factor control unit 32.

It is noted that a three-phase/two-phase converter for converting the three-phase currents to currents in the control coordinate system (γ–δ axes) in the power factor control is the same as the three-phase/two-phase converter in the current equalization controller 318.

FIG. 14 shows the configuration of the modulation rate phase command generation unit 313 in the present embodiment 3. Unlike the above embodiments 1 and 2, the modulation rate phase command generation unit 313 generates the modulation rate command values (inv1*mod, inv2*mod, inv3*mod) and the phase command values (inv1*th, inv2*th, inv3*th) for the respective inverters so as to eliminate the current difference among the currents iuvw1, iuvw2, iuvw3 of the inverters of the three groups.

Thus, in the current equalization controller 318, phase current iuvw3 of the third inverter 20 is added to the above inputs.

FIG. 15 shows the configuration of a current equalization controller 318A in the modulation rate phase command generation unit 313. In the current equalization controller 318A, the first inverter 2 is used as a reference power converter, and by controllers, correction amounts (first group: Δ mod1, second group: Δ mod2 and Δth2, third group: Δ mod3 and Δth3) for the modulation rate command value (mod*ref) and the phase command value (th*ref) are outputted so that the difference between current of the reference power converter and currents of the other power converters (second and third inverters 3 and 20) becomes zero.

For the purpose of discrimination from the current equalization controller in embodiment 3, the current equalization controller in FIG. 15 is denoted by 318A, the current equalization controller in FIG. 16 is denoted by 318B, and the current equalization controller in FIG. 18 is denoted by 318C.

First, the three-phase/two-phase converter 21a to 21c convert three-phase currents of the respective inverters to currents on the control axes (γ–δ axes). The γ currents of the first group, the second group, and the third group after the coordinate conversion are respectively denoted by iγ1, iγ2, iγ3, and similarly, the δ currents of the first to third groups are respectively denoted by iδ1, iδ2, iδ3. First, a controller for calculating a γ-axis voltage correction amount (Vγ1–Vγ2) for the first group and the second group from a γ-axis current difference (iγ1–iγ2) between the first group and the second group, is defined as a C12d controller 22a, and a controller for calculating a δ-axis voltage correction amount (Vδ1–Vδ2) for the first group and the second group from a δ-axis current difference (iδ1–iδ2) between the first group and the second group is defined as a C12q controller 22b. Similarly, a controller for calculating a γ-axis voltage correction amount (Vγ1–V γ3) from a γ-axis current difference (iγ1–iγ3) between the first group and the third group is defined as a C13d controller 23a, and a controller for calculating a δ-axis voltage correction amount (Vδ1–Vδ3) from a δ-axis current difference δ-axis current difference (iδ1–iδ3) is defined as a C13q controller 23b.

In embodiment 1, the C12d controller 22a and the C12q controller 22b perform PI control using a primary delay (on d-axis, term of (Ld–Md) and Ra, and on q-axis, term of (Lq–Mq) and Ra) in expression (5) of the voltage difference and the current difference between the two groups, obtained on the basis of expression (4). Although the motor 305 in the present embodiment 3 is a salient-pole synchronous motor of a field winding type, in the voltage equation, each of a damper winding term and a field winding term is the same among the respective winding groups, and therefore a relational expression of the voltage difference and the current difference between the respective groups complies with expression (5). In the present embodiment 3, the number of winding groups of the motor 305 is three. Among these, for example, a relational expression of the voltage difference and the current difference between the first group and the second group is the same as expression (5) which is a relational expression of the voltage difference and the current difference between the respective groups of an IPM (Interior Permanent Magnet Synchronous Motor) having two winding groups in embodiment 1. Therefore, the C12d controller 22a and the C12q controller 22b are the same as those in embodiment 1, and the C13d controller 23a and the C13q controller 23b also perform the same controls except that inputs and outputs are merely replaced with the current difference and the voltage difference (voltage correction amount) between the first group and the third group.

As described above, the C12d controller 22a and the C12q controller 22b calculate the voltage correction amounts (Vγ1–Vγ2, Vδ1–Vδ2) on γ-axis and δ-axis, from the current differences (iγ1–iγ2, iδ1–iδ2) between the first inverter 2 as the reference power converter, and the second inverter 3. The C13d controller 23a and the C13q controller 23b calculate the voltage correction amounts (Vγ1–Vγ3, Vδ1–Vδ3) on γ-axis and δ-axis, using the current differences (iγ1–iγ3, iδ1–iδ3) between the first inverter and the second inverter.

The modulation rate correction amounts Δ mod1, Δmod2, Δ mod3 for the respective first, second, third groups and the phase correction amounts Δth2, Δth3 are obtained by the correction amount/modulation rate converters 28 which each convert the γ-axis voltage correction amount to the modulation rate correction amount, and the correction amount/phase converters 29 which each convert the δ-axis voltage correction amount to the phase correction amount.

In the present embodiment 3, besides the configuration of PI control using the C12d controller 22a, the C12q controller 22b, the C13d controller 23a, and the C13q controller 23b, another configuration of using a D12d controller 25a, a D12*q* controller 26*b*, a D13*d* controller 27*a*, and a D13*q* controller 27*b* will be also described with reference to FIG. 16.

The C12*d* controller and the C12*q* controller are referred to as C12 controllers when collectively mentioned. The same applies to C13 controllers, D12 controllers, and D13 controllers.

In the current equalization controller 318B in FIG. 16, as compared to the current equalization controller 318A in FIG. 15, the C12*d* controller 22*a*, the C12*q* controller 22*b*, the C13*d* controller 23*a*, and the C13*q* controller 23*b* are replaced with the D12*d* controller 25*a*, the D12*q* controller 26*b*, the D13*d* controller 27*a*, and the D13*q* controller 27*b* as described below. Further, a multiplier 51 which multiplies the frequency command value Fc by 2π is added for converting the frequency command value Fc into an electric angle frequency ωr.

In the C12 controllers and the C13 controllers, the voltage correction amounts are obtained through feedback control on the basis of the current difference between the groups, using a primary-delay term of the resistance Ra and the leakage inductance L in expression (5). However, for example, in such a case where a fast response is needed, a method of obtaining the voltage correction amounts (Vds1−Vds2, Vqs1−Vqs2) from the current differences (ids1−ids2, iqs1−iqs2) using expression (5) itself, may be used. However, in this case, it is difficult to obtain stable correction amounts.

Accordingly, weightings values Kd and Kq are applied to the terms of speed electromotive force in expression (5), and Kd and Kq are changed through feedback control so that the current difference (ids1−ids2) becomes zero, thus generating expression (17) for calculating the voltage correction amounts (Vds1−Vds2, Vqs1−vqs2) to cause the current difference to be zero.

Mathematical 17

$$\begin{bmatrix} v_{ds1} - v_{ds2} \\ v_{qs1} - v_{qs2} \end{bmatrix} = \begin{bmatrix} R_a + P(L_d - M_d) & K_q \times -\omega_r(L_q - M_q) \\ K_d \times \omega_r(L_d - M_d) & R_a + P(L_q - M_q) \end{bmatrix} \cdot \begin{bmatrix} i_{ds1} - i_{ds2} \\ i_{qs1} - i_{qs2} \end{bmatrix} \quad (17)$$

Here, if the differential term is set at zero, the voltage differences (voltage correction amounts) in the D12*d* controller 25*a* and the D12*q* controller 26*b* are calculated by expression (18). In expression (18), Kp is a P gain in PI control, Ki is an I gain, and s is a differential operator.

Mathematical 18

$$V\gamma 1 - V\gamma 2 = Ra \times (i\gamma 1 - i\gamma 2) + K_q \times \{-\omega_r(L_q - M_q)\} \times (i\delta 1 - i\delta 2) \quad (18)$$
$$V\delta 1 - V\delta 2 = Ra \times (i\delta 1 - i\delta 2) + K_d \times \{-\omega_r(L_d - M_d)\} \times (i\gamma 1 - i\gamma 2)$$
$$K_d = \frac{Kps + Ki}{s}(i\gamma 1 - i\gamma 2), K_q = \frac{Kps + Ki}{s}(i\delta 1 - i\delta 2)$$

In the above expressions (17) and (18), ωr is an electric angle frequency of a motor rotor. However, in the present embodiment 3, a magnetic pole position sensor for the motor is not provided, and therefore it is impossible to obtain an accurate mechanical frequency of the motor. The frequency of the inverter is used as the electric angle frequency ωr (rad/s) of the motor. Therefore, as shown in FIG. 16, ωr (unit: rad/s) converted from the frequency command value Fc (unit: Hz) is inputted to the D12*d* controller 25*a*, the D12*q* controller 26*b*, the D13*d* controller 27*a*, and the D13*q* controller 27*b*.

Similarly, also in the D13*d* controller 27*a* and the D13*q* controller 27*b*, the voltage correction amounts Vγ1−Vγ3 and Vδ1−Vδ3 can be obtained.

As described above, the voltage correction amounts are obtained by the C12 controllers and the C13 controllers or the D12 controllers and the D13 controllers, and then, on the basis of the voltage correction amounts, the modulation rate correction amounts Δ mod1, Δ mod2, Δ mod3 for the first to third inverters are obtained by the correction amount/modulation rate converters 28, and the phase correction amounts Δth2, Δth3 are obtained by the correction amount/phase converters 29. Then, as shown in FIG. 14, from these correction amounts, the modulation rate command values and the phase command values for the respective inverters are generated.

In the current equalization controller 318A, 318B in the present embodiment 3, one inverter is set as the reference power converter, and then, using the current differences between the reference power converter and the other inverters, the C12 controllers and the C13 controllers or the D12 controllers and the D13 controllers generate the modulation rate correction amounts and the phase correction amounts for eliminating the current differences, for the respective inverters.

However, as shown in FIG. 18, the equalization current control of the reference power converter may be performed by setting a current reference value as in embodiment 2 and using the C1*d* controller 24*a* and the C1*q* controller 24*b* so as to reach the current reference value. As for the other inverters, in the same manner as in the present embodiment 3, the modulation rate correction amounts and the phase correction amounts may be generated for the respective inverters, using the current differences relative to the reference power converter.

In this case, in output of the current equalization controller 318C, as compared to output of the current equalization controller shown in FIG. 14 and FIG. 15, the phase correction amount Δth1 for the first inverter is added, and in the modulation rate phase command generation unit 313C, as shown in FIG. 17, the current reference values id*ref, iq*ref are inputted in addition to the inputs shown in FIG. 14.

By the above configuration, it becomes possible to perform stable control so as to equalize the currents of the respective inverters and cause these currents to be a desired value, even if the difference between the current reference value and the current value of each inverter is great.

For the purpose of discriminating the respective modulation rate phase command generation units in embodiment 3, as compared to the modulation rate phase command generation unit 313 in FIG. 14, the modulation rate phase command generation unit in FIG. 17 is denoted by 313C.

Although DC voltage variation is not described in the present embodiment 3, in the case of triangular wave comparison PWM in which the command value frequency and the carrier are not in an integer multiple relationship as in asynchronous PWM, there is a problem that, when the number of times of switching is small, due to discrepancy between those frequencies, DC voltage oscillates at an uncertain low frequency also during acceleration, and the current difference is likely to increase due to the oscillation. By applying the invention of the present embodiment 3, in low-order harmonic eliminating PWM, a waveform that is symmetric between positive and negative and is synchronized with the frequency of the command value is obtained, and therefore the above problem does not arise.

The motor in the present embodiment 3 is not limited to a salient-pole synchronous motor of a field winding type, but the same effect is provided also in the case of using a permanent magnet motor or an induction motor.

As described above, in the drive control apparatus for multiple-winding motor of embodiment 3, one inverter is set as a reference power converter, and currents of the other inverters are controlled so as to coincide with current of the reference power converter, thereby equalizing currents flowing through respective windings of a multiple-winding AC motor. Therefore, even in the case of using inverters having switching devices slow in switching speed, it is possible to perform PWM control with harmonics reduced while maximally utilizing a small number of times of switching, and perform highly accurate correction of imbalance among voltage phases and amplitudes of a plurality of inverters.

Although not described in the present embodiments 1 to 3, in the case of using inverters having a wide operation frequency range, in order to obtain the phase correction amounts by the current equalization controller, it is necessary to change a limit value for each output value of the PI controller (C12$q$ controller, C13$q$ controller, C1$q$ controller, C2$q$ controller) in accordance with the speed.

For example, as described in embodiment 1, in the case where, on the basis of the number of pulses, the control carrier is set and the frequency at which the control is performed is set, if the speed is low, there are large number of pulses and therefore the control is performed more frequently. In addition, phase variation per unit time is small. Therefore, depending on disturbance, the control might become unstable due to overcorrection. Therefore, in such a case, the limit value is lowered, and on the other hand, in the case of high-speed operation, the limit value is raised, thereby enabling accurate command correction irrespective of the speed (i.e., output frequency or frequency command value) or the number of pulses, without causing overcorrection as described above.

Further, as for the phase command value, since the phase change amount per unit time differs depending on the magnitude of the speed, a method of changing the effective bit length of the phase correction amount in accordance with the speed, the number of pulses, or the modulation rate is effective to achieve further fine correction. For example, the effective bit length of an integral process is shortened in the case of low speed, and is prolonged in the case of high speed, and the position of the decimal point is changed in accordance with the speed. Thus, it is possible to achieve phase correction with high accuracy even in the case of further high speed.

As described above, the control of generating the modulation rate command values and the phase command values so that the amplitudes and phases of the fundamental waves of output voltages (after dead times are added) of the inverters coincide with each other at voltage pattern level so as to equalize currents of the two or more inverters, is effectively performed at a timing when the pulse becomes stable. Thus, even with a small number of times of control (low control load), and even with a small number of times of switching, it is possible to reduce harmonics, and it is possible to prevent occurrence of a current difference even if a voltage difference occurs between the inverters. Further, the motor control can be prevented from becoming unstable due to mutual interference by magnetic coupling between windings caused by current imbalance. In particular, even in a motor having a small number of poles and a strong coupling between windings, loss due to current imbalance can be suppressed in both fundamental waves and harmonics.

In the case of using a control configuration in which, in the current equalization controller, a reference power converter is set and the correction amounts for the modulation rate command value and the phase command value for each inverter are obtained from the current difference relative to the other power converters, the number of controllers can be decreased by one as compared to the number of the inverters, whereby the processing load can be reduced.

Similarly, it is possible to employ a control configuration in which the reference power converter is set, and only for the reference power converter, as in the first inverter in embodiment 2, a current reference value is set and the voltage correction amount, the modulation rate correction amount, and the phase correction amount are obtained through PI control on the basis of the current difference from the reference value, and for the other inverters, the modulation rate correction amount and the phase correction amount are obtained on the basis of the difference relative to the reference power converter by the two kinds of control methods described in embodiment 3. In this case, although the same number of controllers as the number of the inverters are needed, the control can be accurately and stably performed and an optimum combination of control methods can be selected depending on control response requirement and a load.

It is noted that, within the scope of the present invention, the above embodiments may be freely combined with each other, or each of the above embodiments may be modified or simplified as appropriate.

INDUSTRIAL APPLICABILITY

The present invention relates to a control device for driving a multiple-winding motor having a plurality of windings by a plurality of inverters, and enables reduction in harmonics and highly accurate correction of imbalance among the inverters. Therefore, the present invention is widely applicable to, in particular, large-capacity drive control apparatus for multiple-winding motor.

The invention claimed is:
1. A drive control apparatus for multiple-winding motor, comprising:
a plurality of power converters each of which has a switching device for driving a multiple-winding AC motor and converts a DC power supply to a variable-voltage and variable-frequency AC power supply; and
a control unit for controlling the power converters, wherein
the control unit includes:
an output voltage control unit for calculating and outputting output voltage and an output voltage phase for driving the multiple-winding AC motor at a desired rotation speed; and
a PWM control unit for performing PWM control for the switching device,
the output voltage control unit includes:
an output voltage determination unit for determining the output voltage on the basis of a frequency command;
an output voltage phase calculating unit for calculating the output voltage phase through integration on the basis of the frequency command; and
a modulation rate phase command generation unit which calculates d-axis current and q-axis current of each power converter on the basis of the output voltage phase, calculates a modulation rate correction amount and a phase correction amount for each power converter in order to equalize currents flowing through windings of the multiple-winding AC motor, on the basis of the d-axis current and the q-axis current, and generates a modulation rate command and a phase command for controlling each power converter, on the basis of the modulation rate correction amount and the phase correction amount, the PWM control unit includes:
a modulation rate calculation unit for calculating a modulation rate on the basis of the output voltage calculated by the output voltage control unit and DC voltage of the DC power supply;
a pulse number determination unit for determining a number of pulses per half cycle of the PWM control for the switching device, on the basis of the frequency command;
a pattern table for storing, for each number of pulses and for each magnitude of the modulation rate, a switching pattern for reducing a low-order harmonic in the output voltage; and
a gate signal generator for generating a gate signal for driving the switching device, using the switching pattern from the pattern table, on the basis of the modulation rate from the modulation rate calculation unit, the number of pulses from the pulse number determination unit, and the output voltage phase calculated by the output voltage control unit, and the modulation rate phase command generation unit performs control for equalizing currents of the power converters, and a phase or frequency at which the control is performed is changed in accordance with any of the number of pulses, the modulation rate, the frequency command, and the switching pattern.

2. The drive control apparatus for multiple-winding motor according to claim 1, wherein
the modulation rate phase command generation unit calculates a difference between the d-axis currents of the power converters and a difference between the q-axis currents of the power converters, and controls the differences to be zero.

3. The drive control apparatus for multiple-winding motor according to claim 2, wherein
the modulation rate phase command generation unit sets a response of calculation of the modulation rate correction amount and the phase correction amount, to be lower than an output frequency calculated from the frequency command.

4. The drive control apparatus for multiple-winding motor according to claim 2, wherein
the modulation rate phase command generation unit sets a predetermined limit value for calculated values of the phase correction amounts for the power converters, and changes the limit value in accordance with any of the number of pulses, the modulation rate, and the frequency command.

5. The drive control apparatus for multiple-winding motor according to claim 2, wherein
the modulation rate phase command generation unit changes a number of significant decimal digits of calculation of the phase correction amounts for the power converters, or a bit length of the phase correction amounts, in accordance with any of the number of pulses, the modulation rate, and the frequency command.

6. The drive control apparatus for multiple-winding motor according to claim 1, wherein
the modulation rate phase command generation unit
sets current reference values for d-axis and q-axis currents, using the d-axis and q-axis currents of the power converters,
calculates differences between the respective d-axis and q-axis currents of each power converter and the respective current reference values for d-axis and q-axis currents, and
controls the differences to be zero.

7. The drive control apparatus for multiple-winding motor according to claim 6, wherein
the modulation rate phase command generation unit sets a response of calculation of the modulation rate correction amount and the phase correction amount, to be lower than an output frequency calculated from the frequency command.

8. The drive control apparatus for multiple-winding motor according to claim 6, wherein
the modulation rate phase command generation unit sets a predetermined limit value for calculated values of the phase correction amounts for the power converters, and changes the limit value in accordance with any of the number of pulses, the modulation rate, and the frequency command.

9. The drive control apparatus for multiple-winding motor according to claim 6, wherein
the modulation rate phase command generation unit changes a number of significant decimal digits of calculation of the phase correction amounts for the power converters, or a bit length of the phase correction amounts, in accordance with any of the number of pulses, the modulation rate, and the frequency command.

10. The drive control apparatus for multiple-winding motor according to claim 1, wherein
the modulation rate phase command generation unit
sets specific one of the power converters as a reference power converter,
calculates differences between the respective d-axis and q-axis currents of the reference power converter and the respective d-axis and q-axis currents of each of the other power converters, and
controls the differences to be zero.

11. The drive control apparatus for multiple-winding motor according to claim 10, wherein
the modulation rate phase command generation unit sets a response of calculation of the modulation rate correction amount and the phase correction amount, to be lower than an output frequency calculated from the frequency command.

12. The drive control apparatus for multiple-winding motor according to claim 10, wherein
the modulation rate phase command generation unit sets a predetermined limit value for calculated values of the phase correction amounts for the power converters, and changes the limit value in accordance with any of the number of pulses, the modulation rate, and the frequency command.

13. The drive control apparatus for multiple-winding motor according to claim 10, wherein
the modulation rate phase command generation unit changes a number of significant decimal digits of calculation of the phase correction amounts for the power converters, or a bit length of the phase correction amounts, in accordance with any of the number of pulses, the modulation rate, and the frequency command.

14. The drive control apparatus for multiple-winding motor according to claim 1, wherein
the modulation rate phase command generation unit
sets current reference values for d-axis and q-axis currents, using the d-axis and q-axis currents of the power converters, and sets specific one of the power converters as a reference power converter,
for the reference power converter, calculates differences between the respective d-axis and q-axis currents of the reference power converter and the respective current reference values for d-axis and q-axis currents, and controls the differences to be zero, and
for the power converters other than the reference power converter, calculates differences between the respective d-axis and q-axis currents of each of the power converters and the respective d-axis and q-axis currents of the reference power converter, and controls the differences to be zero.

15. The drive control apparatus for multiple-winding motor according to claim 14, wherein
the modulation rate phase command generation unit sets a response of calculation of the modulation rate correction amount and the phase correction amount, to be lower than an output frequency calculated from the frequency command.

16. The drive control apparatus for multiple-winding motor according to claim 14, wherein
the modulation rate phase command generation unit sets a predetermined limit value for calculated values of the phase correction amounts for the power converters, and changes the limit value in accordance with any of the number of pulses, the modulation rate, and the frequency command.

17. The drive control apparatus for multiple-winding motor according to claim 14, wherein
the modulation rate phase command generation unit changes a number of significant decimal digits of calculation of the phase correction amounts for the power converters, or a bit length of the phase correction amounts, in accordance with any of the number of pulses, the modulation rate, and the frequency command.

18. The drive control apparatus for multiple-winding motor according to claim 1, wherein
the modulation rate phase command generation unit sets a response of calculation of the modulation rate correction amount and the phase correction amount, to be lower than an output frequency calculated from the frequency command.

19. The drive control apparatus for multiple-winding motor according to claim 1, wherein
the modulation rate phase command generation unit sets a predetermined limit value for calculated values of the phase correction amounts for the power converters, and changes the limit value in accordance with any of the number of pulses, the modulation rate, and the frequency command.

20. The drive control apparatus for multiple-winding motor according to claim 1, wherein
the modulation rate phase command generation unit changes a number of significant decimal digits of calculation of the phase correction amounts for the power converters, or a bit length of the phase correction amounts, in accordance with any of the number of pulses, the modulation rate, and the frequency command.

* * * * *